United States Patent
Yu et al.

(10) Patent No.: US 12,015,733 B2
(45) Date of Patent: *Jun. 18, 2024

(54) DO-NOT-DISTURB METHOD AND TERMINAL

(71) Applicant: HUAWEI TECHNOLOGIES CO., LTD., Shenzhen (CN)

(72) Inventors: Yanhui Yu, Shenzhen (CN); Yuchuan Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,978

(22) Filed: Jun. 15, 2022

(65) Prior Publication Data

US 2022/0311859 A1 Sep. 29, 2022

Related U.S. Application Data

(63) Continuation of application No. 16/964,250, filed as application No. PCT/CN2018/083963 on Apr. 20, 2018, now Pat. No. 11,405,499.

(51) Int. Cl.
| | |
|---|---|
| *G06F 3/0484* | (2022.01) |
| *G06F 9/445* | (2018.01) |
| *H04M 1/72463* | (2021.01) |

(52) U.S. Cl.
CPC ...... *H04M 1/72463* (2021.01); *G06F 3/0484* (2013.01); *G06F 9/44568* (2013.01)

(58) Field of Classification Search
CPC .............. H04M 1/72463; G06F 3/0484; G06F 9/44568; G06F 3/165
See application file for complete search history.

(56) References Cited

U.S. PATENT DOCUMENTS

| | | | |
|---|---|---|---|
| 6,504,990 B1 | 1/2003 | Abecassis | |
| 7,565,680 B1 * | 7/2009 | Asmussen | .......... H04N 21/4223 725/135 |

(Continued)

FOREIGN PATENT DOCUMENTS

| | | |
|---|---|---|
| CN | 101894004 A | 11/2010 |
| CN | 103327173 A | 9/2013 |

(Continued)

OTHER PUBLICATIONS

Anonymous,"How do I disable the video that is automatically played by WeChat on an Android phone", retrieved from: https://jingyan.baidu.com/article/22fe7ced3fb60c3003617f6d.html, Dec. 24, 2014, 9 pages.

(Continued)

*Primary Examiner* — Ryan F Pitaro
(74) *Attorney, Agent, or Firm* — Maier & Maier, PLLC

(57) ABSTRACT

A do-not-disturb method and a terminal. The method includes: displaying, by the terminal, an interface of a first application, then, if the interface of the first application includes a media playing window, and the first application is in a media do-not-disturb mode, determining whether any first media playing in the window was triggered by a playing operation of a user. If the playing of the first media in the window was triggered by the playing operation of the user, the method includes playing the corresponding media, and if the playing of the first media in the window was not triggered by the playing operation of the user, the method includes pausing or stopping play of the corresponding media. This method can avoid automatic playing of media, to reduce resource waste, data traffic consumption, a processing load of a mobile phone, and power consumption.

9 Claims, 18 Drawing Sheets

(56) References Cited

U.S. PATENT DOCUMENTS

| | | | | |
|---|---|---|---|---|
| 8,477,109 | B1* | 7/2013 | Freed | G06F 3/04842 |
| | | | | 345/173 |
| 10,275,087 | B1* | 4/2019 | Smith | G06F 3/0416 |
| 10,725,647 | B2* | 7/2020 | Klein | G06F 3/04845 |
| 10,776,511 | B2* | 9/2020 | Decker | H04L 67/535 |
| 2005/0015472 | A1* | 1/2005 | Catania | G06F 9/542 |
| | | | | 705/37 |
| 2007/0244586 | A1* | 10/2007 | Champion | G06F 3/165 |
| | | | | 370/252 |
| 2009/0273712 | A1* | 11/2009 | Landy | G11B 27/34 |
| | | | | 348/E9.034 |
| 2010/0039296 | A1* | 2/2010 | Marggraff | G06F 3/03545 |
| | | | | 341/20 |
| 2010/0040349 | A1 | 2/2010 | Landy | |
| 2010/0287472 | A1* | 11/2010 | Eversole | G06F 8/61 |
| | | | | 715/705 |
| 2012/0139929 | A1 | 6/2012 | Kaza et al. | |
| 2013/0223812 | A1* | 8/2013 | Rossi | H04N 21/2393 |
| | | | | 386/230 |
| 2013/0330059 | A1* | 12/2013 | Matsumoto | H04N 21/4325 |
| | | | | 386/241 |
| 2014/0068440 | A1 | 3/2014 | Wiltzius et al. | |
| 2014/0321671 | A1 | 10/2014 | An et al. | |
| 2014/0334797 | A1* | 11/2014 | Lee | G11B 27/28 |
| | | | | 386/241 |
| 2015/0019963 | A1* | 1/2015 | Park | G06F 9/453 |
| | | | | 715/708 |
| 2015/0242183 | A1* | 8/2015 | Lu | H04N 21/439 |
| | | | | 700/94 |
| 2015/0324832 | A1* | 11/2015 | Kaufman | H04L 67/535 |
| | | | | 705/14.27 |
| 2015/0334170 | A1* | 11/2015 | Panguluri | H04N 21/26208 |
| | | | | 709/201 |
| 2015/0358577 | A1* | 12/2015 | Zhou | H04L 65/1069 |
| | | | | 348/14.01 |
| 2016/0259413 | A1* | 9/2016 | Anzures | G06F 3/0483 |
| 2017/0046039 | A1* | 2/2017 | Karunamuni | G06F 3/04855 |
| 2017/0132659 | A1* | 5/2017 | Dirks | G06Q 30/0247 |
| 2017/0168705 | A1 | 6/2017 | Li | |
| 2017/0195385 | A1* | 7/2017 | Wang | H04L 45/24 |
| 2017/0244809 | A1* | 8/2017 | Chae | H04L 41/0869 |
| 2017/0365223 | A1* | 12/2017 | VanBlon | G09G 3/342 |
| 2018/0011628 | A1* | 1/2018 | Kano | G06F 3/04845 |
| 2018/0035155 | A1 | 2/2018 | Garner et al. | |
| 2018/0253274 | A1* | 9/2018 | Wang | G06F 16/29 |
| 2018/0270517 | A1 | 9/2018 | Maillot et al. | |
| 2018/0278884 | A1* | 9/2018 | Abe | H04N 5/772 |
| 2018/0349636 | A1* | 12/2018 | Bhowmick | H04L 67/535 |
| 2018/0349638 | A1* | 12/2018 | Barraclough | G06F 3/0483 |
| 2018/0373803 | A1* | 12/2018 | Shultz | G06F 16/9577 |
| 2019/0034073 | A1 | 1/2019 | Shi et al. | |
| 2020/0117419 | A1* | 4/2020 | Kusano | H04N 21/8113 |
| 2020/0177967 | A1* | 6/2020 | Rakshit | H04N 21/4852 |
| 2020/0192551 | A1* | 6/2020 | Herzog | G06F 3/04817 |
| 2020/0192558 | A1* | 6/2020 | Chase | G06F 3/04847 |
| 2021/0029180 | A1* | 1/2021 | Kulchinsky | H04L 65/4015 |
| 2021/0092219 | A1* | 3/2021 | Hwang | H04M 1/72454 |
| 2021/0240165 | A1* | 8/2021 | Noh | H04M 1/725 |
| 2022/0058978 | A1* | 2/2022 | Lewis | G09B 15/08 |

FOREIGN PATENT DOCUMENTS

| | | |
|---|---|---|
| CN | 105100897 A | 11/2015 |
| CN | 105160220 A | 12/2015 |
| CN | 105704531 A | 6/2016 |
| CN | 106033306 A | 10/2016 |
| CN | 106125959 A | 11/2016 |
| CN | 107426091 A | 12/2017 |
| CN | 107483721 A | 12/2017 |
| CN | 107526502 A | 12/2017 |

OTHER PUBLICATIONS

Anonymous, "How can I disable WeChat videos? Disabling Automatic Playback of Small WeChat Videos", retrieved from: https://www.jb51.net/softjc/226334.html, Oct. 2, 2014, 6 pages.

Samuel Gibbs. "Facebook users vexed by sound on autoplaying videos—here's how to stop it", The Guardian, Jul. 19, 2017, 10 pages.

Martin Brinkmann. "How to control audio and video autoplay in Google Chrome." gHacks Tech News, Feb. 6, 2018, 5 pages.

Carlos Vega. "How to turn off video autoplay on iOS or Android for Twitter, Facebook and Instagram." Digital Trends, Jan. 14, 2017, 21 pages.

Anonymous, "command line—Play only audio with VLC—Ask Ubuntu", Oct. 30, 2013, Retrieved from the Internet: URL:https://askubuntu.com/questions/368736/play-only-audio-with-vlc, 2 pages.

Steele, "How to Turn Off Autoplay Videos", PCMag, Sep. 22, 2017, 5 pages.

* cited by examiner

DO-NOT-DISTURB METHOD AND TERMINAL

CROSS-REFERENCE TO RELATED APPLICATIONS

This application is a continuation of U.S. patent application Ser. No. 16/964,250, filed on Jul. 23, 2020, which is a national stage of International Application No. PCT/CN2018/083963, filed on Apr. 20, 2018. Both of the aforementioned applications are hereby incorporated by reference in their entireties.

TECHNICAL FIELD

The embodiments relate to the field of terminal technologies, a do-not-disturb method, and a terminal.

BACKGROUND

With continuous optimization and improvement of various functions of terminals in recent years, a do-not-disturb mode may be set on an existing terminal. In the do-not-disturb mode, the terminal may be configured with a do-not-disturb time period, and an incoming call ringtone, an SMS ringtone or the like will be muted in the do-not-disturb time period. This assists a user in a time period when the user does not want to be disturbed. However, in a current trend, there are increasingly more applications having an automatic media playing function on the terminal, for example, WECHAT, WEIBO, and TIKTOK. WECHAT is used as an example. A user opens Moments of WECHAT on a mobile phone, and when an advertisement playing window is displayed in the Moments, an advertisement is automatically played. However, some media is not necessarily what the user really wants to watch, and automatic playing of these media causes a waste of resources. In addition, if data traffic of the terminal is turned on, automatic playing of the media consumes data traffic. This causes an economic loss to the user, and the prior art cannot resolve the problem.

SUMMARY

Embodiments contemplated herein provide a do-not-disturb method and a terminal, to reduce automatic playing of media in a terminal (such as an existing terminal design) and reduce possible resource waste and possible data traffic consumption.

According to a first aspect, an embodiment provides a do-not-disturb method, applicable to a terminal on which a first application is installed. The method includes: displaying, by the terminal, an interface of the first application; if the interface of the first application includes a media playing window, and the first application is in a media do-not-disturb mode, determining whether playing of first media in the window is triggered by a playing operation of a user; if the playing of the first media in the window is triggered by the playing operation of the user, playing the corresponding media; and if the playing of the first media in the window is not triggered by the playing operation of the user, pausing or stopping play of the corresponding media.

In this embodiment, the first application on the terminal may be set to be in the media do-not-disturb mode, and the terminal may determine whether the playing of the first media in the media playing window on the interface of the first application is triggered by the playing operation of the user; and if the playing of the first media in the window is triggered by the playing operation of the user, the terminal plays the corresponding media; or if the playing of the first media in the window is not triggered by the playing operation of the user, the terminal pauses or stops playing the corresponding media. In this manner, whether media is played in the media playing window is determined based on the playing operation of the user. This can avoid automatic playing of the media, to reduce resource waste, data traffic consumption, a processing load of a mobile phone, and power consumption.

When a condition for playing the first media in the window is met, a player is created to play the first media, and a creation time point of the player is determined. When determining whether the playing of the corresponding media in the window is triggered by the playing operation of the user, the terminal determines whether a target input event exists in obtained input events, where the target input event is an input event corresponding to the playing operation of the user, a distribution time point of the target input event is earlier than the creation time point of the player, a time difference between the distribution time point of the target input event and the creation time point of the player is less than first preset duration, and the target input event is distributed to the first application. If the target input event exists, the terminal determines that the playing of the first media in the window is triggered by the playing operation of the user. If the target input event does not exist, the terminal determines that the playing of the first media in the window is not triggered by the playing operation of the user.

In this embodiment, the target input event determined by the terminal from the obtained input events needs to meet three conditions: 1. The target input event is an input event corresponding to the playing operation; 2. The distribution time point of the target input event is earlier than the creation time point of the player, and the time difference between the two time points is less than preset duration; and 3. An app to which the target input event is distributed is the same as an app on which the player is created. Based on the three conditions, the target input event may be accurately determined, in other words, whether the playing of the corresponding media in the window is triggered by the playing operation of the user may be accurately determined. This manner can avoid automatic playing of media, which may reduce resource waste, data traffic consumption, a processing load of a mobile phone, and power consumption.

When the terminal determines whether the target input event exists in the obtained input events, the following steps are performed: determining whether a first input event corresponding to the playing operation of the user exists in the obtained input events; if the first input event exists, determining whether a second input event in which the time difference between the distribution time point and the creation time point is less than the preset duration exists in the first input event; if the second input event exists, determining whether an application to which the second input event is distributed and an application on which the player is created are a same application; if the two applications are the same application, determining that the target input event exists, where the target input event is the second input event; and if the two applications are not the same application, determining that the target input event does not exist.

In this embodiment, it can be understood from the foregoing content that the target input event needs to meet the three conditions. In this case, when determining the target input event from the obtained input events, the terminal may determine whether an input event in the obtained input events successively meets the three conditions. If all the three conditions are met, the input event is the target input event. In the process of determining whether an input event in the obtained input events successively meets the three conditions, a determining sequence is not limited. For example, it may be first determined whether the first condition is met. After the first condition is met, it is determined whether the second condition is met. After the second condition is met, it is determined whether the third condition is met. Based on the three conditions, the target input event may be accurately determined, in other words, whether the playing of the corresponding media in the window is triggered by the playing operation of the user may be accurately determined. This manner can avoid automatic playing of media, to reduce resource waste, data traffic consumption, a processing load of a mobile phone, and power consumption.

A package name of an application to which the target input event is distributed is the same as a package name of the first application; and/or a process ID of an application to which the target input event is distributed is the same as a process ID of the first application.

In this embodiment, the app to which the target input event is distributed and the app on which the player is created may be the same app. Because one app corresponds to one or more processes, when one app corresponds to one process, a mobile phone only needs to determine whether the package name of the app to which the target input event is distributed is the same as a package name of the app on which the player is created, or the mobile phone only needs to determine whether the process ID of the app to which the target input event is distributed is the same as a process ID of the app on which the player is created. When one app corresponds to a plurality of processes, after determining whether the package name of the app to which the target input event is distributed is the same as the package name of the app on which the player is created, the mobile phone may further determine whether the process ID of the app to which the target input event is distributed is the same as the process ID of the app on which the player is created. In this manner, whether the app on which the player is created and the app to which the target input event is distributed are a same app can be accurately determined.

If the playing of the first media in the window is not triggered by the playing operation of the user, and total duration of the first media is greater than second duration, the playing of the first media is paused or stopped.

In this embodiment, for some media that is not consciously triggered by the user and that has relatively long playing duration, the terminal may pause or stop playing the first media. This manner can avoid automatic playing of media, to reduce resource waste, data traffic consumption, a processing load of a mobile phone, and power consumption.

If the playing of the first media in the window is not triggered by the playing operation of the user, the terminal displays a first control in the media playing window or in a pop-up window, where the first control is configured to trigger the playing of the first media; and when the first control is triggered, the terminal plays the first media.

In this embodiment, when the media playing window appears on the interface of the first application, but the playing of the first media in the window is unconsciously triggered by the user, the terminal pauses or stops media playing. However, the terminal may further display the first control. For example, when the terminal pauses or stops media playing, the media playing window displays a black screen, but the terminal displays the first control in the media playing window or in the pop-up window. If the user wants to play media, the user may trigger the first control. In this manner, the terminal can avoid automatic playing of media, to reduce resource waste. In addition, after media playing is paused or stopped, the user may further trigger media playing, to improve user experience.

First prompt information in a form of text or icon is displayed in the media playing window or in the pop-up window, to prompt that automatic playing is not allowed or prompt the user whether to play the first media.

In this embodiment, when the media playing window appears on the interface of the first application, but the playing of the first media in the window is unconsciously triggered by the user, the terminal pauses or stops the media playing. The terminal may display the first prompt information in the media playing window or in the pop-up window, to prompt that automatic playing is not allowed or prompt the user whether to play the first media. In this manner, the terminal can avoid automatic playing of media, to reduce resource waste. In addition, after media playing is paused or stopped, the user may further trigger media playing, to improve user experience.

In response to an operation of the user, or when it is detected that data traffic is turned on, or when the terminal is in a conference mode or a mute mode, the terminal displays a first interface for setting the media do-not-disturb mode, where the first interface includes a control for setting whether to enable the media do-not-disturb mode; and in response to an operation of activating, by the user, the control for setting whether to enable the media do-not-disturb mode, the media do-not-disturb mode is enabled for all or some applications on the terminal.

In this embodiment, the terminal displays, in a scenario (for example, the user actively performs a setting process, or the data traffic is turned on, or the terminal is in the conference mode), the first interface for setting the media do-not-disturb mode. The user may enable the media do-not-disturb mode for all or some applications on the terminal by using the control on the first interface. This manner can avoid automatic playing of media, to reduce resource waste, data traffic consumption, a processing load of a mobile phone, and power consumption.

In response to an operation of the user, or when it is detected that data traffic is turned on, or when the terminal is in a conference mode or a mute mode, the terminal displays a first interface for setting the media do-not-disturb mode, where the first interface includes a control for setting whether to enable the media do-not-disturb mode; in response to an operation of activating, by the user, the control for setting whether to enable the media do-not-disturb mode, the terminal displays a second interface for setting the media do-not-disturb mode, where the second interface includes identifiers of M applications and M controls for setting whether to enable the media do-not-disturb mode, the M controls respectively correspond to the M applications, and M is an integer greater than or equal to 1; and in response to an operation of activating, by the user, one of the M controls, the terminal enables the media do-not-disturb mode for an application corresponding to the control.

In this embodiment, the user may enable, based on a requirement of the user, the media do-not-disturb mode for an application on the terminal. For example, if the user frequently uses WECHAT, the user may enable the media do-not-disturb mode for WECHAT. This manner can avoid automatic playing of media, to reduce resource waste, and data traffic consumption.

In response to an operation of the user, or when it is detected that data traffic is turned on, or when the terminal is in a conference mode or a mute mode, the terminal displays a second interface for setting the media do-not-disturb mode, where the second interface includes identifiers of M applications and M controls for setting whether to enable the media do-not-disturb mode, the M controls respectively correspond to the M applications, and M is an integer greater than or equal to 1.

In this embodiment, the terminal displays, in a scenario (for example, the user actively performs a setting process, or the data traffic is turned on, or the terminal is in the conference mode), the second interface for setting the media do-not-disturb mode. The user may enable the media do-not-disturb mode for an application on the terminal by using the M controls on the second interface. This manner can avoid automatic playing of media, to reduce resource waste, data traffic consumption, a processing load of a mobile phone, and power consumption.

When it is detected that the terminal accesses a Wi-Fi network, the terminal prompts the user to disable the media do-not-disturb mode or displays the first interface.

Generally, when the terminal accesses the Wi-Fi network, the user prefers automatic playing of media. Therefore, in this embodiment, after the terminal is in the media do-not-disturb mode, if it is detected that the terminal has accessed the Wi-Fi network, the terminal may prompt the user to disable the media do-not-disturb mode, or display the first interface for setting the media do-not-disturb mode, and the user may then disable the media do-not-disturb mode by using the control on the first interface. This helps improve user experience.

The terminal includes a display screen and a memory. The memory stores a software program and/or a module of the first application, and a software program and/or a module at a framework layer. The display screen displays the interface of the first application. The framework layer determines whether playing of the first media in the window is triggered by the playing operation of the user. The framework layer plays the corresponding media if the playing of the first media in the window is triggered by the playing operation of the user. The framework layer pauses or stops playing the corresponding media if the playing of the first media in the window is not triggered by the playing operation of the user.

In this embodiment, when the media playing window appears on the interface of the first application, the framework layer determines whether the playing of the first media in the window is triggered by the playing operation of the user. If the playing of the first media in the window is triggered by the playing operation of the user, the framework layer plays the media. If the playing of the first media in the window is not triggered by the playing operation of the user, the framework layer pauses or stops playing the media. This manner can avoid automatic playing of media, to reduce resource waste, data traffic consumption, a processing load of a mobile phone, and power consumption.

When the interface of the first application includes the media playing window, the framework layer creates a player to play the first media. The framework layer determines a creation time point of the player. Determination, by the framework layer, of whether the playing of the first media in the window is triggered by the playing operation of the user includes: the framework layer determines whether a target input event exists in obtained input events, where the target input event is an input event corresponding to the playing operation of the user, a distribution time point of the target input event is earlier than the creation time point of the player, a time difference between the distribution time point of the target input event and the creation time point of the player is less than a first preset duration, and the target input event is distributed to the first application; if the target input event exists, the framework layer determines that the playing of the first media in the window is triggered by the playing operation of the user; and if the target input event does not exist, the framework layer determines that the playing of the first media in the window is not triggered by the playing operation of the user.

In this embodiment, the framework layer determines whether the playing of the first media in the window is triggered by the playing operation of the user, in other words, the framework layer determines whether the target input event exists in the obtained input events. If the target input event exists, the framework layer determines that the playing of the first media in the window is triggered by the playing operation of the user. If the target input event does not exist, the framework layer determines that the playing of the first media in the window is not triggered by the playing operation of the user. This manner can avoid automatic playing of media, to reduce resource waste, data traffic consumption, a processing load of a mobile phone, and power consumption.

According to a second aspect, an embodiment provides a do-not-disturb method, applicable to a terminal on which a first application is installed. The method includes: displaying, by the terminal, an interface of the first application, where the interface of the first application includes a media playing window; receiving request information that is sent by the first application and that is used to create a player; if the first application is in a media do-not-disturb mode, determining whether generation of the request information is triggered by a playing operation of a user; and if the generation of request information is triggered by the playing operation of the user, creating the player to play corresponding media.

In this embodiment, when the first application on the terminal is in the media do-not-disturb mode, if the media playing window appears on the screen that is of the first application and that is displayed on the terminal, the first application generates the request information used to request to create the player. The terminal determines whether the generation of the request information is triggered by the playing operation of the user. If the generation of the request information is triggered by the playing operation of the user, the terminal plays the corresponding media. If the generation of the request information is not triggered by the playing operation of the user, the terminal pauses or stops playing the corresponding media. In this manner, whether media is played in the media playing window is determined based on the playing operation of the user. This can avoid automatic playing of the media, to reduce resource waste, data traffic consumption, a processing load of a mobile phone, and power consumption.

The request information includes a generation time point at which the request information is generated. Determining whether generation of the request information is triggered by a playing operation of a user includes: determining whether a target input event exists in obtained input events, where the target input event is an input event corresponding to the playing operation of the user, a distribution time point of the target input event is earlier than the generation time point of the request information, a time difference between the distribution time point of the target input event and the generation time point is less than first preset duration, and the target input event is distributed to the first application; if the target input event exists, determining that the generation of the request information is triggered by the playing operation of the user; and if the target input event does not exist, determining that the generation of the request information is not triggered by the playing operation of the user.

In this embodiment, the target input event determined by the terminal from the obtained input events needs to meet three conditions: 1, the target input event is an input event corresponding to the playing operation; 2, the distribution time point of the target input event is earlier than the generation time point of the request information, and the time difference between the two time points is less than preset duration; and 3, an app to which the target input event is distributed is the same as an app on which the player is created. Based on the three conditions, the target input event may be accurately determined, in other words, whether the generation of the request information is triggered by the playing operation of the user may be accurately determined. This manner can avoid automatic playing of media, to reduce resource waste, data traffic consumption, a processing load of a mobile phone, and power consumption.

When the terminal determines whether the target input event exists in the obtained input events, the following steps are performed: determining whether a first input event corresponding to the playing operation of the user exists in the obtained input events; if the first input event exists, determining whether a second input event in which the time difference between the distribution time point and the creation time point is less than the preset duration exists in the first input event; if the second input event exists, determining whether an application to which the second input event is distributed and an application on which the player is created are the same application; if the two applications are the same application, determining that the target input event exists, where the target input event is the second input event; and if the two applications are not the same application, determining that the target input event does not exist.

In this embodiment, it can be understood from the foregoing content that the target input event needs to meet the three conditions. In this case, when determining the target input event from the obtained input events, the terminal may determine whether an input event in the obtained input events successively meets the three conditions. If all the three conditions are met, the input event is the target input event. In the process of determining whether an input event in the obtained input events successively meets the three conditions, a determining sequence is not limited. For example, it may be first determined whether the first condition is met. After the first condition is met, it is determined whether the second condition is met. After the second condition is met, it is determined whether the third condition is met. Based on the three conditions, the target input event may be accurately determined, in other words, whether the generation of the request information is triggered by the playing operation of the user may be accurately determined. This manner can avoid automatic playing of media, to reduce resource waste, data traffic consumption, a processing load of a mobile phone, and power consumption.

A package name of an application to which the target input event is distributed may be the same as a package name of the first application; and/or a process ID of an application to which the target input event is distributed is the same as a process ID of the first application.

After the generation of the request information is not triggered by the playing operation of the user, the terminal displays a first control in the media playing window or in a pop-up window, where the first control is configured to trigger creation of the player to play the first media; and when the first control is triggered, the terminal creates the player to play the first media.

First prompt information in a form of text or icon is displayed in the media playing window or in the pop-up window, to prompt that automatic playing is not allowed or prompt the user whether to play the first media.

A condition for playing the first media in the window includes: all or some parts of the media playing window is displayed, or the media playing window is displayed in the center of a display screen of the terminal.

In response to an operation of the user, or when it is detected that data traffic is turned on, or when the terminal is in a conference mode or a mute mode, the terminal displays a first interface for setting the media do-not-disturb mode, where the first interface includes a control for setting whether to enable the media do-not-disturb mode; and in response to an operation of activating, by the user, the control for setting whether to enable the media do-not-disturb mode, the media do-not-disturb mode is enabled for all or some applications on the terminal.

In response to the operation of activating, by the user, the control for setting whether to enable the media do-not-disturb mode, the media do-not-disturb mode may be enabled for all or some applications on the terminal includes: in response to the operation of activating, by the user, the control for setting whether to enable the media do-not-disturb mode, displaying a second interface for setting the media do-not-disturb mode, where the second interface includes identifiers of M applications and M controls for setting whether to enable the media do-not-disturb mode, the M controls respectively correspond to the M applications, and M is an integer greater than or equal to 1; and by respectively responding to operations of activating, by the user, N controls in the M controls, enabling the media do-not-disturb mode for N applications corresponding to the N controls, where N is an integer less than or equal to M.

In response to an operation of the user, or when it is detected that data traffic is turned on, or when the terminal is in a conference mode or a mute mode, the terminal displays a second interface for setting the media do-not-disturb mode, where the second interface includes identifiers of M applications and M controls for setting whether to enable the media do-not-disturb mode, the M controls respectively correspond to the M applications, and M is an integer greater than or equal to 1.

When it is detected that the terminal accesses a wireless network, the terminal prompts the user to disable the media do-not-disturb mode or displays the first interface.

The terminal includes a display screen and a memory. The memory includes a software program and/or a module of the first application, and a software program and/or a module at a framework layer. The display screen displays the interface of the first application. The framework layer obtains request information that is generated by the first application and that is used to request to create the player. The framework layer determines whether the generation of the request information is triggered by the playing operation of the user. If the generation of the request information is triggered by the playing operation of the user, the framework layer creates the player, to play corresponding media. If the generation of the request information is not triggered by the playing operation of the user, the framework layer rejects or discards the request information.

In this embodiment, when the media playing window appears on the interface of the first application, the framework layer obtains the request information used to request to create the player, and the framework layer determines whether the generation of the request information is triggered by the playing operation of the user. If the generation of the request information is triggered by the playing operation of the user, the framework layer creates the player to play media. If the generation of the request information is not triggered by the playing operation of the user, the framework layer rejects or discards the request information. This manner can avoid automatic playing of media, to reduce resource waste, data traffic consumption, a processing load of a mobile phone, and power consumption.

The request information may include a generation time point at which the first application generates the request information. Determining, with the, framework layer, whether the generation of the request information is triggered by the playing operation of the user includes: the framework layer determines whether a target input event exists in obtained input events, where the target input event is an input event corresponding to the playing operation of the user, a distribution time point of the target input event is earlier than the generation time point of the request information, a time difference between the distribution time point of the target input event and the generation time point is less than first preset duration, and the target input event is distributed to the first application; if the target input event exists, the framework layer determines that the generation of the request information is triggered by the playing operation of the user; and if the target input event does not exist, the framework layer determines that the generation of the request information is not triggered by the playing operation of the user.

In this embodiment, when the media playing window appears on the interface of the first application, the framework layer obtains the request information used to request to create the player, and the framework layer determines whether the generation of the request information is triggered by the playing operation of the user. The framework layer may determine whether the target input event exists in the obtained input events. If the target input event exists, the framework layer determines that the playing of the first media in the window is triggered by the playing operation of the user. If the target input event does not exist, the framework layer determines that the playing of the first media in the window is not triggered by the playing operation of the user. This manner can avoid automatic playing of media, which may reduce resource waste, data traffic consumption, a processing load of a mobile phone, and power consumption.

According to a third aspect, an embodiment provides a do-not-disturb method. The method is applicable to a terminal. The method includes: when the terminal is in a media do-not-disturb mode, if a player is created in a running process of the first application on the terminal to play media, determining whether an input event that matches a player creation event exists, where the input event is an input event that may trigger a playback activity; if the input event exists, playing, by the terminal, the media; and if the input event does not exist, pausing or stopping, by the terminal, playing the media.

In this embodiment, the terminal may be set to a do-not-disturb mode, and the player may be created in the running process of the first application. For example, when a media playing window appears on an interface of the first application, the player may be created. Alternatively, when the first application (an SMS application or a phone application) receives information or an incoming call from another terminal, the player may be created. After creating the player, the terminal determines whether an input event that matches the player creation event exists. If the input event exists, it indicates that the player creation event is actively triggered by a user. If the input event does not exist, it indicates that the player creation event is not actively triggered by the user but is automatically triggered by the first application or triggered due to another reason. If the player creation event is actively triggered by the user, the terminal plays the media. If the player creation event is not actively triggered by the user, the terminal pauses or stops playing the media. This manner can avoid automatic playing of media, to reduce resource waste, data traffic consumption, a processing load of a mobile phone, and power consumption.

The determining, by the terminal, whether an input event that matches a player creation event exists includes: determining, by the terminal, a creation time point of the player, and determining, by the terminal, whether a target input event exists in obtained input events, where the target input event is an input event corresponding to a playing operation of the user, a distribution time point of the target input event is earlier than the creation time point of the player, a time difference between the distribution time point of the target input event and the creation time point of the player is less than first preset duration, and the target input event is distributed to the first application; if the target input event exists, determining that the input event that matches the player creation event exists; and if the target input event does not exist, determining that the input event that matches the player creation event does not exist.

When the terminal determines whether the target input event exists in the obtained input events, the following steps are performed: determining whether a first input event corresponding to the playing operation of the user exists in the obtained input events; if the first input event exists, determining whether a second input event in which the time difference between the distribution time point and the creation time point is less than the preset duration exists in the first input event; if the second input event exists, determining whether an application to which the second input event is distributed and an application on which the player is created are the same application; if the two applications are the same application, determining that the target input event exists, where the target input event is the second input event; and if the two applications are not the same application, determining that the target input event does not exist.

A package name of an application to which the target input event is distributed is the same as a package name of the first application; and/or a process ID of an application to which the target input event is distributed is the same as a process ID of the first application.

According to a fourth aspect, an embodiment provides a terminal, including a processor and a memory. The memory is configured to store one or more computer programs. When the one or more computer programs stored in the memory are executed by the processor, the terminal is enabled to implement the method in the first aspect. Alternatively, when one or more computer programs stored in the memory are executed by the processor, the terminal is enabled to implement the method in the second aspect. Alternatively, when one or more computer programs stored in the memory are executed by the processor, the terminal is enabled to implement the third aspect.

According to a fifth aspect, an embodiment further provides a terminal. The terminal includes modules/units for performing the method in a the first aspect. Alternatively, the terminal includes modules/units for performing the method in the second aspect. Alternatively, the terminal includes modules/units for performing the method in the third aspect.

These modules/units may be implemented by hardware or may be implemented by hardware by executing corresponding software.

According to a sixth aspect, an embodiment further provides a computer-readable storage medium. The computer-readable storage medium includes a computer program, and when the computer program is run on a terminal, the terminal is enabled to perform the method in the first aspect. Alternatively, when the computer program is run on a terminal, the server is enabled to perform the method in the second aspect. Alternatively, when the computer program is run on a terminal, the first terminal is enabled to perform the method in the third aspect.

According to a seventh aspect, an embodiment further provides a computer program product. When the computer program product is run on a terminal, the terminal is enabled to perform the method in the first aspect. Alternatively, when the computer program product is run on a terminal, the terminal is enabled to perform the method in the second aspect. Alternatively, when the computer program product is run on a terminal, the terminal is enabled to perform the method in the third aspect.

DETAILED DESCRIPTION OF THE EMBODIMENTS

Figure 1:
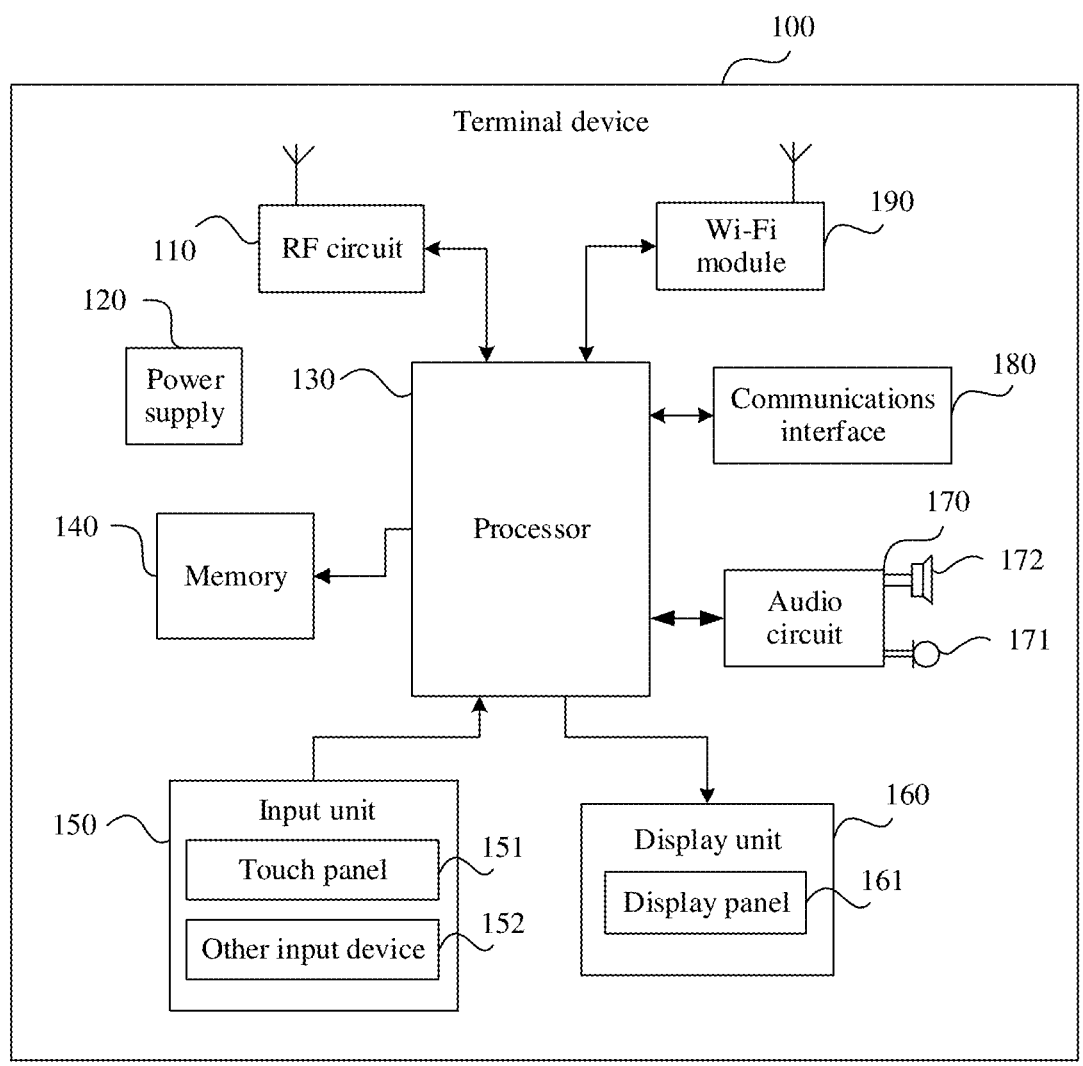
FIG. 1 is a schematic diagram of a hardware architecture of a terminal according to an embodiment.

The following describes the embodiments provided herein with reference to the accompanying drawings.

In the following, some terms in the embodiments are described, to help a person skilled in the art have a better understanding.

A terminal in the embodiments may also be referred to as user equipment (UE). Various applications (apps for short in the following description) may be installed on the terminal, for example, WECHAT, email, and microblog. The terminal may be a smartphone, a tablet computer, various wearable devices, a vehicle-mounted device, or the like.

An operating system (OS) in the embodiments provided herein is the most basic system software running on the terminal. For example, in a smartphone, the operating system may be an Android system or an IOS system. In the following, the Android system is used as an example for description. A person skilled in the art may understand that in another operating system, a similar algorithm may also be used for implementation.

Generally, a plurality of applications may be run on the terminal at the same time. In a simpler variation, one application may correspond to one process, and in a more complex variation, one application may correspond to a plurality of processes. Each process has a process ID.

In an example in which a user performs a touch operation on a touchscreen, the touchscreen detects the touch operation, and generates a corresponding hardware interrupt. After receiving the touch operation, a kernel layer of the operating system processes the touch operation into an original input event (including information about, for example, touching coordinates and touching a corresponding time stamp) and stores the original input event in a device node in the kernel layer. A framework layer reads the original input event from the device node and performs processing such as translation and encapsulation on the original input event, to obtain an input event that includes more information. Then, the framework layer distributes the input event to an interested application or software module, and the application or the software module responds to the received input event, for example, updates a window picture of the application or the software module or performs an operation.

Media in the embodiments provided herein includes streaming media (including audio, video, and the like), and further includes a system notification tone such as a short messaging service (SMS) ringtone and an incoming call ringtone. The system notification tone may be stored locally in the terminal. The streaming media may be understood as media that is obtained by encapsulating (compressing, encoding, and packaging), by a network device, data such as video data and sound data, sending the encapsulated data to the terminal based on a time sequence, and decapsulating and playing, by the terminal, received data while subsequent data continuously arrives at the terminal.

"A plurality of" in the embodiments provided herein indicates "two or more".

In addition, it should be understood that in the description, terms such as "first" and "second" are merely used for distinction description and shall not be understood as an indication or implication of relative importance or an indication or implication of an order.

An embodiment provides a do-not-disturb method and a terminal. The method is applicable to the terminal. FIG. 1 is a diagram of a structure of a possible terminal. Refer to FIG. 1. The terminal 100 includes components such as a radio frequency (RF) circuit 110, a power supply 120, a processor 130, a memory 140, an input unit 150, a display unit 160, an audio circuit 170, a communications interface 180, and a wireless fidelity (Wi-Fi) module 190. A person skilled in the art may understand that the structure of the terminal 100 shown in FIG. 1 does not constitute a limitation on the terminal 100, and the terminal 100 provided in this embodiment may include more or fewer components than those shown in the figure, or combine some components, or have different component arrangements.

The following describes components of the terminal 100 in detail with reference to FIG. 1.

The RF circuit 110 may be configured to receive and send data in a communication or call process. After receiving downlink data from a base station, the RF circuit 110 sends the downlink data to the processor 130 for processing and sends to-be-sent uplink data to the base station. The RF circuit 110 usually includes but is not limited to an antenna, at least one amplifier, a transceiver, a coupler, a low noise amplifier (LNA), a duplexer, and the like.

The RF circuit 110 may further communicate with a network and another device through radio communication. Any communications standard or protocol may be used for the radio communication, including but not limited to a global system for mobile communications (GSM), a general packet radio service (GPRS), code division multiple access (CDMA), wideband code division multiple access (WCDMA), long term evolution (LTE), email, SMS, and the like.

A Wi-Fi technology is a short-range radio transmission technology. The terminal 100 may be connected to an access point (AP) by using the Wi-Fi module 190, to implement access to a data network. The Wi-Fi module 190 may be configured to receive and send data in a communication process.

The terminal 100 may be physically connected to another device by using the communications interface 180. Optionally, the communications interface 180 is connected to a communications interface of the other device by using a cable, to implement data transmission between the terminal 100 and the other device.

In this embodiment, the terminal 100 can implement a communication service and send information to another contact. Therefore, the terminal 100 needs to have a data transmission function. In other words, a communications module needs to be included in the terminal 100. Although FIG. 1 shows communications modules such as the RF circuit 110, the Wi-Fi module 190, and the communications interface 180, it may be understood that the terminal 100 includes at least one of the foregoing components or another communications module (for example, a Bluetooth module) configured to implement communication, to perform data transmission.

For example, when the terminal 100 is a mobile phone, the terminal 100 may include the RF circuit 110 and the Wi-Fi module 190. When the terminal 100 is a computer, the terminal 100 may include the communications interface 180 and the Wi-Fi module 190. When the terminal 100 is a tablet, the terminal 100 may include the Wi-Fi module.

The memory 140 may be configured to store a software program and a module. The processor 130 runs the software program and the module stored in the memory 140, to execute various function applications of the terminal 100 and process data.

Optionally, the memory 140 may include a program storage area and a data storage area. The program storage area may store an operating system (including software programs or modules respectively corresponding to a kernel layer, a framework layer, an application layer, and the like). The application layer may include various applications, for example, an application having a media automatic playing function. The data storage area may store multimedia files such as various pictures and video files.

In addition, the memory 140 may include a high-speed random access memory, and may further include a nonvolatile memory, for example, at least one magnetic disk storage device, a flash memory device, or another volatile solid-state storage device.

The input unit 150 may be configured to receive digit or character information entered by a user and generate key signal input related to user settings and function control of the terminal 100.

Optionally, the input unit 150 may include a touch panel 151 and another input device 152.

The touch panel 151 is also referred to as a touchscreen, may collect a touch operation (for example, an operation of the user on the touch panel 151 or near the touch panel 151 by using any appropriate object or accessory such as a finger or a stylus) of the user on or near the touch panel 151, and drive a corresponding connection apparatus according to a preset program. Optionally, the touch panel 151 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into coordinates of a touch point, and then transmits the coordinates to the processor 130, and can receive and execute a command sent by the processor 130. In addition, the touch panel 151 may be implemented in various types, such as a resistive type, a capacitive type, an infrared type, and a surface acoustic wave type.

Optionally the another input device 152 may include but is not limited to one or more of a physical keyboard, a function key (for example, a volume control key or a power on/off key), a tracking ball, a mouse, a control lever, and the like.

The display unit 160 may be configured to display information entered by the user or information provided for the user, and various menus of the terminal 100. The display unit 160 is a display system of the terminal 100 and is configured to present a screen to implement human-computer interaction.

The display unit 160 may include a display panel 161. Optionally, the display panel 161 may be configured in a form of a liquid crystal display (LCD) screen, an organic light-emitting diode (OLED), or the like.

Further, the touch panel 151 may cover the display panel 161. After detecting the touch operation on or near the touch panel 151, the touch panel 151 transmits the touch operation to the processor 130 to determine a type of a touch event, and then the processor 130 provides a corresponding visual output on the display panel 161 based on the type of the touch event.

In FIG. 1, the touch panel 151 and the display panel 161 act as two independent components to implement input and output functions of the terminal 100. However, in some embodiments, the touch panel 151 and the display panel 161 may be integrated to implement the input and output functions of the terminal 100.

The processor 130 is a control center of the terminal 100, is connected to all components by using various interfaces and lines and executes various functions of the terminal 100 and processes data by running or executing the software program and/or the module stored in the memory 140 and invoking data stored in the memory 140. Therefore, a plurality of services based on the terminal 100 are implemented.

Optionally, the processor 130 may include one or more processing units. Optionally, the processor 130 may integrate an application processor and a modem processor. The application processor processes an operating system. The modem processor processes radio communication. It may be understood that the modem processor may alternatively not be integrated into the processor 130.

The terminal 100 further includes the power supply 120 (for example, a battery) configured to supply power to the components. Optionally, the power supply 120 may be logically connected to the processor 130 by using a power management system, to implement functions such as charge management, discharge management, and power consumption management by using the power management system.

As shown in FIG. 1, the terminal 100 further includes the audio circuit 170, a microphone 171, and a loudspeaker 172, and may provide an audio interface between the user and the terminal 100. The audio circuit 170 may be configured to convert audio data into a signal that can be identified by the loudspeaker 172 and transmit the signal to the loudspeaker 172. The loudspeaker 172 converts the signal into a sound signal for output. The microphone 171 is configured to collect an external sound signal (for example, a sound of a person speaking, or another sound), convert the collected external sound signal into a signal that can be identified by the audio circuit 170, and send the signal to the audio circuit 170. The audio circuit 170 may further be configured to convert the signal sent by the microphone 171 into audio data, and then output the audio data to the RF circuit 110 for sending to, for example, another terminal, or output the audio data to the memory 140 for subsequent processing.

Although not shown, the terminal 100 may further include at least one sensor, a camera, and the like. Details are not described herein.

The following describes a background technology related to embodiments herein.

Figure 2:
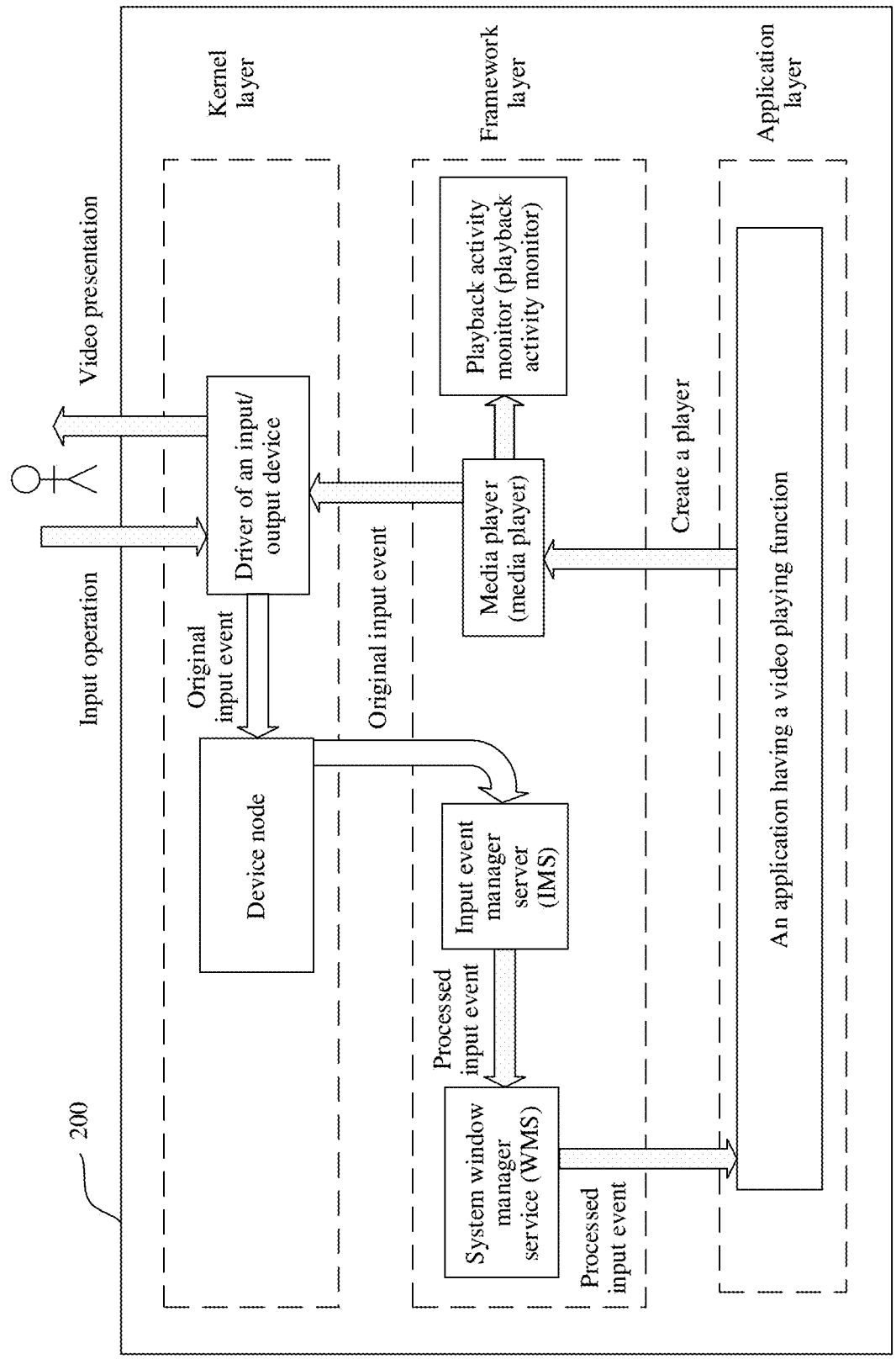
FIG. 2 is a schematic flowchart of triggering, by a terminal by using an input event, an app to play a video in the prior art.

FIG. 2 is a schematic diagram of triggering, by an input event, an app to play a video in the prior art. In FIG. 2, a terminal is a mobile phone 200 as an example, and an Android system is used as an example. As shown in the figure, a software architecture of the mobile phone 200 includes three layers: a kernel layer, a framework layer, and an application layer. Further, in the software architecture shown in FIG. 2, a system runtime library layer (not shown in FIG. 2) may further be included between the kernel layer and the framework layer. The system runtime library layer supports an upper layer, namely, the framework layer. When the framework layer is used, the Android operating system runs a C/C++ library included in the system runtime library layer to implement a function to be implemented by the framework layer.

The kernel layer includes a driver of an input/output device (a keyboard, a touchscreen, an earphone, a loudspeaker, a microphone, or the like) and a device node. A user performs an input operation by using the input device. The kernel layer generates a corresponding original input event based on the input operation and stores the original input event in the device node.

The framework layer includes an input manager service (IMS) and a system window management service (WMS). An input reader (not shown in the figure) in the IMS may perform processing such as translation and encapsulation on the original input event stored in the device node, to obtain an input event that includes more information, and send the obtained input event to the WMS. The WMS stores a tappable area (for example, a control) of each application, location information of a focus window, and the like. Therefore, the WMS can correctly distribute the input event to a specified control or focus window.

The application layer includes an application having a video playing function, for example, a web browser, an instant messaging application, or a video application (for example, YouTube or Youku) that specially provides video content. For example, the input operation is a tap operation. If an input event corresponding to the tap operation is distributed to a play control in the web browser or the instant messaging application, the web browser or the instant messaging application starts a player at the framework layer by invoking a media player interface at the framework layer. Then, the web browser or the instant messaging application plays a video. In FIG. 2, the media player invokes a playback activity monitor interface, and monitors a pause state, a playing state, or the like of the player by using a playback activity monitor.

The foregoing describes a process in which the user triggers, by performing an input operation, the app to play the video. For an app that has a media automatic playing function, for example, WECHAT, WEIBO, or TIKTOK, a video playing process is different from the foregoing process. For example, when using WECHAT, the user taps the touchscreen to open a display interface of WECHAT Moments. When a media playing window appears on the display screen, WECHAT automatically triggers, without a playing operation of the user, the framework layer to create a player, to implement automatic playing of media such as an advertisement. Such media playing that is unconsciously triggered by the user may not be desired by the user, and such automatic advertisement playing may cause resource waste, and may further consume data traffic, increase a processing load of the mobile phone, waste power, and even affect a data uploading speed or a data downloading speed of another running process (for example, software downloading and photo cloud synchronization).

An embodiment provides a do-not-disturb method and a terminal. In the method, the terminal is in a media do-not-disturb mode. When the terminal creates a player, the terminal may determine whether the creation of the player is actively triggered by a user. If the creation of the player is actively triggered by the user, the terminal plays media. If the creation of the player is not actively triggered by the user, the terminal pauses playing the media. This method can avoid automatic playing of the media, to reduce resource waste, data traffic consumption, a processing load of a mobile phone, power consumption, and an impact on a data uploading speed or a data downloading speed of another running process.

Figure 3:
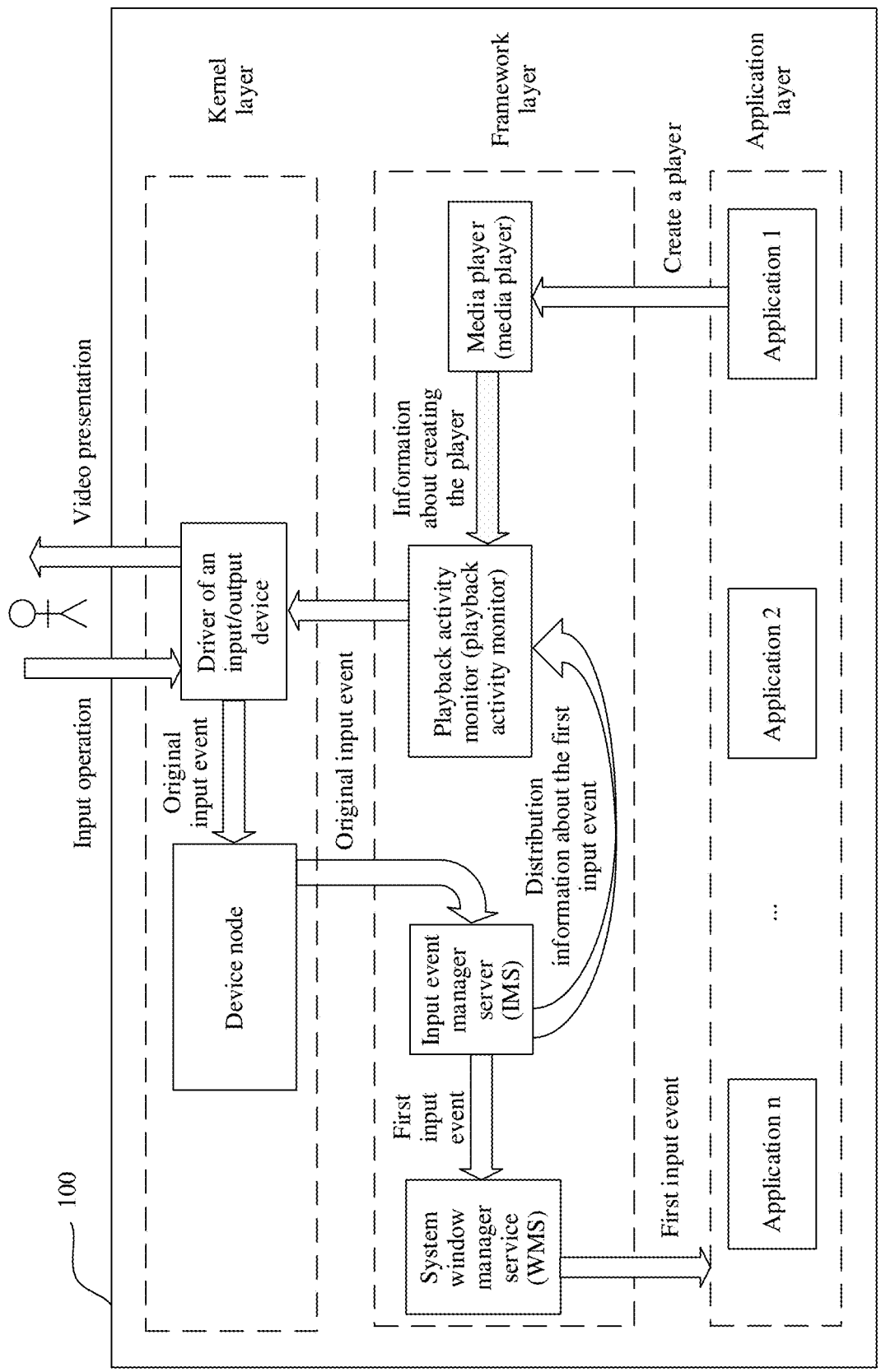
FIG. 3 is a schematic diagram of a software architecture of a terminal according to an embodiment.

FIG. 1 is a schematic diagram of a hardware framework of a terminal according to an embodiment. Correspondingly, FIG. 3 is a schematic diagram of a software architecture of a terminal according to an embodiment. As shown in FIG. 3, the software architecture of the terminal 100 includes three layers: a kernel layer, a framework layer, and an application layer. Compared with FIG. 2, a function of identifying an input event that is in input events and that may trigger a playback activity is added to an IMS in FIG. 3. A function of comparing distribution information of the input event identified by the IMS with information about creating a player on an application on the terminal 100 is added to a playback activity monitor. Details are described below.

Functions of the kernel layer, the framework layer, and the application layer and same parts as those shown in FIG. 2 are not described herein again. It should be understood that FIG. 1 shows the hardware architecture in this embodiment, and FIG. 3 shows the software architecture in this embodiment. A software program and/or a module corresponding to the software architecture in FIG. 3 are/is stored in the memory 140. The processor 130 runs the software program and an application that are stored in the memory 140 to perform the following processes:

(1) After reading the original input event from the device node and processing the original input event to obtain the input event that includes more information, the IMS identifies the obtained input event, and identifies a first input event, where the first input event includes an input event that may trigger a playback activity. Then, the IMS distributes the first input event to a corresponding app (for example, app 1) at the application layer by using the WMS. The IMS records distribution information of the first input event, for example, a package name, a process ID, and a distribution time point of the app 1.

(2) When the app 1 is run, because of a playing operation of the user, or because the user unconsciously activates a playing window when browsing an application screen, or in another case, the app 1 invokes a media player interface at the framework layer to create a player, the media player also needs to record related information about creating the player, for example, the package name and the process ID of the app 1 on which the player is created, and a creation time point. Then, the app 1 invokes the playback activity monitor interface at the framework layer and sends the information about creating the player to the playback activity monitor.

(3) The playback activity monitor may obtain the distribution information of the first input event recorded in the IMS. Then, the playback activity monitor searches for a second input event from the first input event, where a distribution time point of the second input event is earlier than the creation time point, and a time difference between the distribution time point and the creation time point of the player is less than preset duration. Then, the playback activity monitor determines whether the package name (or the process ID) of the app 1 to which the second input event is distributed is the same as the package name (or the process ID) of the app 1 on which the player is created. If the package names are the same, media is played, for example, the app 1 invokes a media player start interface (not shown in the figure) at the framework layer to play the media. An implementation in the prior art may be used, though embodiments provided herein are not limited thereto. If the package names are different, the playing of the media is paused, for example, the app 1 invokes a media player pause interface (not shown in the figure) at the framework layer to pause the player. When the package names are different, the playing of the media may alternatively be stopped, for example, the app 1 invokes a media player stop interface at the framework layer to stop playing the media.

Figure 4A:
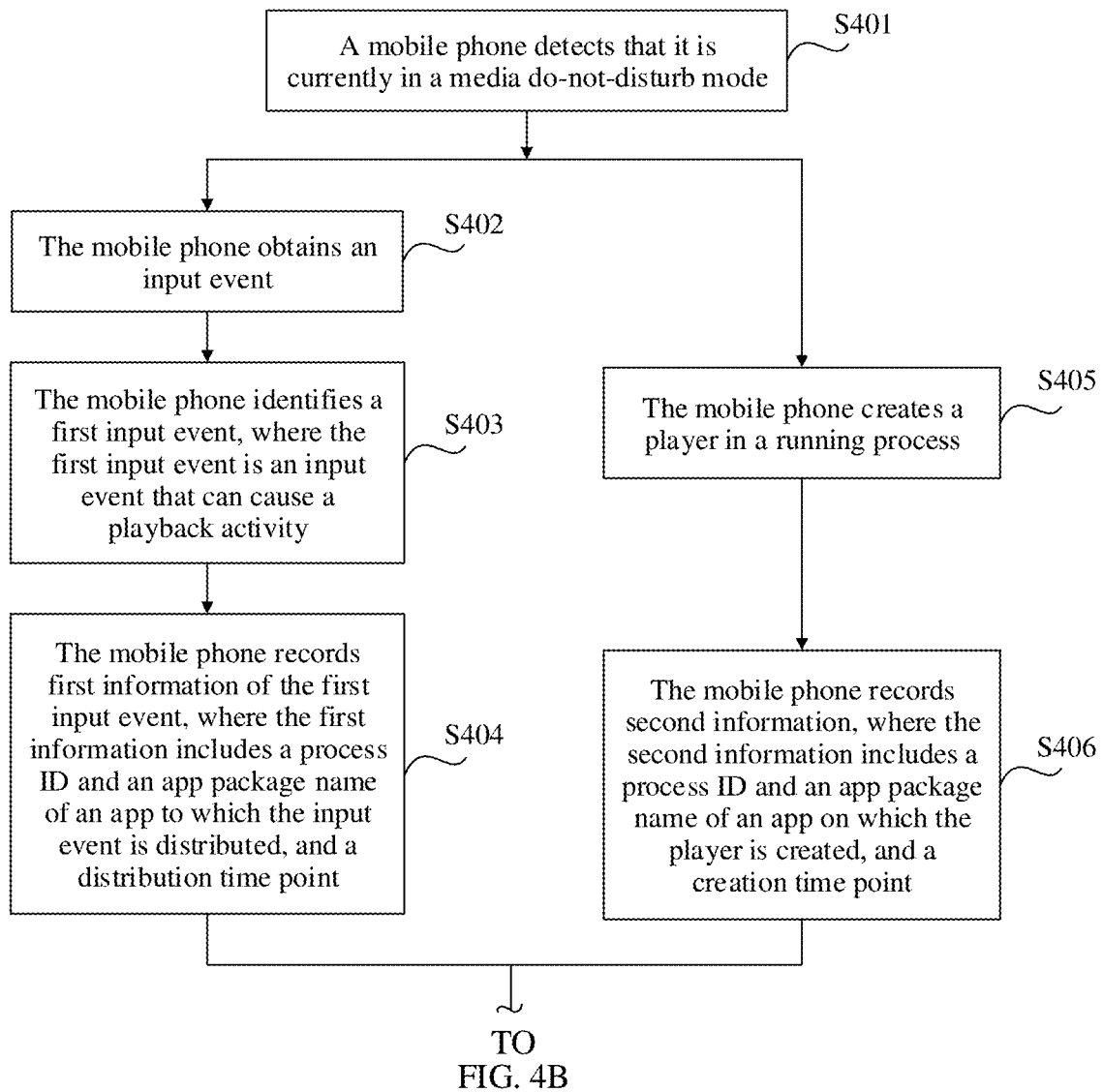
FIG. 4A and FIG. 4B are a schematic flowchart of a do-not-disturb method according to an embodiment.
Figure 4B:
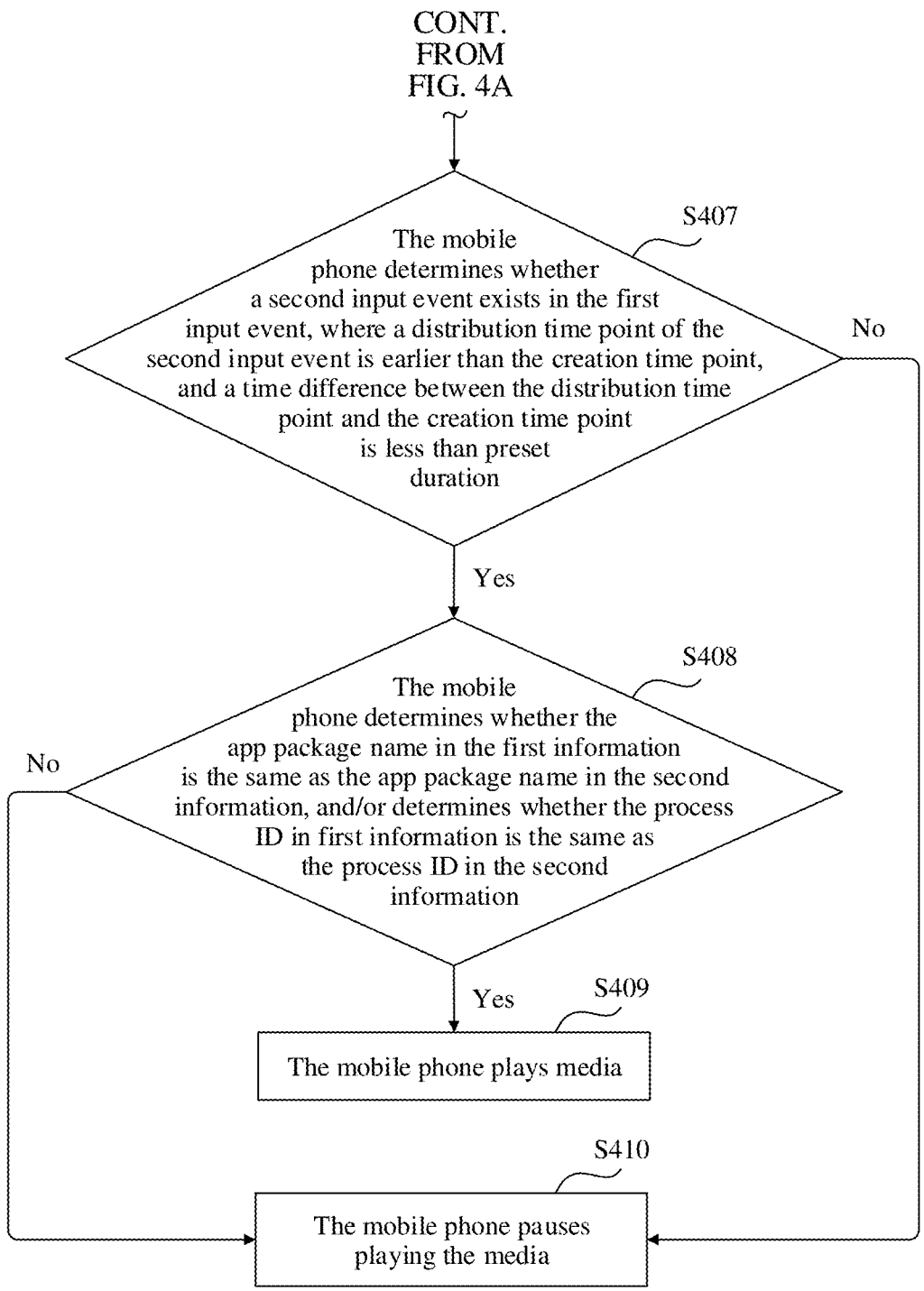

FIG. 4A and FIG. 4B show a do-not-disturb method according to an embodiment. In the following description, a mobile phone is used as an example for description. It should be understood that a hardware architecture of the mobile phone is shown in FIG. 1, and a software architecture is shown in FIG. 3. A software program and/or a module corresponding to the software architecture of the mobile phone are/is stored in the memory 140. The processor 130 runs the software program and an application that are stored in the memory 140, to perform a procedure of the do-not-disturb method provided in this embodiment. As shown in FIG. 4A and FIG. 4B, the procedure of the method may include the following steps.

S401: The mobile phone detects that the mobile phone is currently in a media do-not-disturb mode.

Similar to a scenario mode such as a conference mode or an outdoor mode, the mobile phone may also have a media do-not-disturb mode, and a user may enable the media do-not-disturb mode on the mobile phone. It should be noted that, in this embodiment, unless otherwise specified, the "media do-not-disturb mode" is a mode in which automatic playing of media is not allowed. For example, when WECHAT is in the media do-not-disturb mode, automatic playing of media in WECHAT is not allowed.

For example, when running a software program and/or a module at a kernel layer, the processor 130 in the mobile phone detects whether the mobile phone is currently in the media do-not-disturb mode.

In an example, the user may enable setting options on the mobile phone, and start the media do-not-disturb mode in the setting options.

Figure 5A:
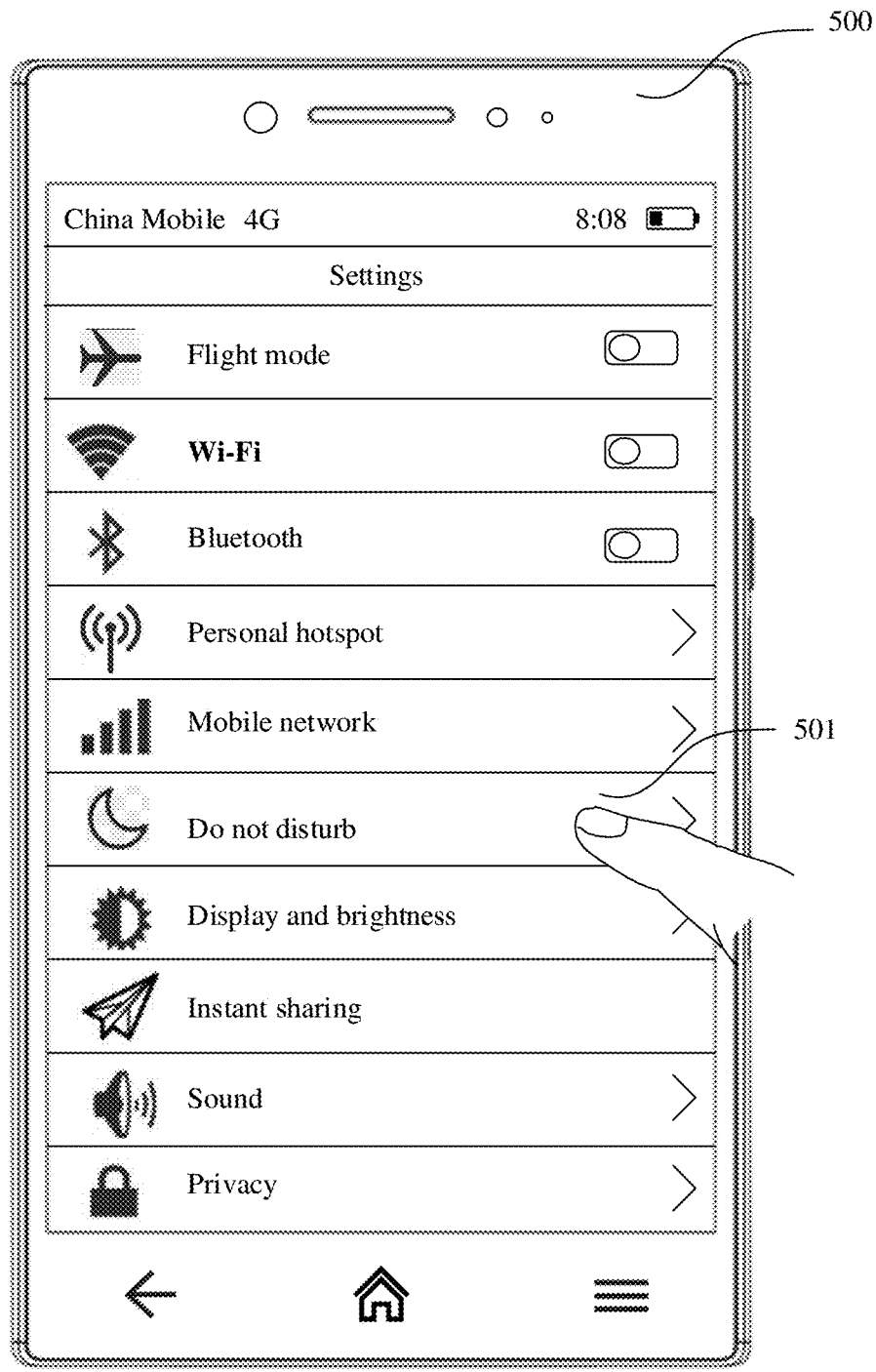
FIG. 5A is a schematic diagram of setting an app in a terminal according to an embodiment.
Figure 5B:
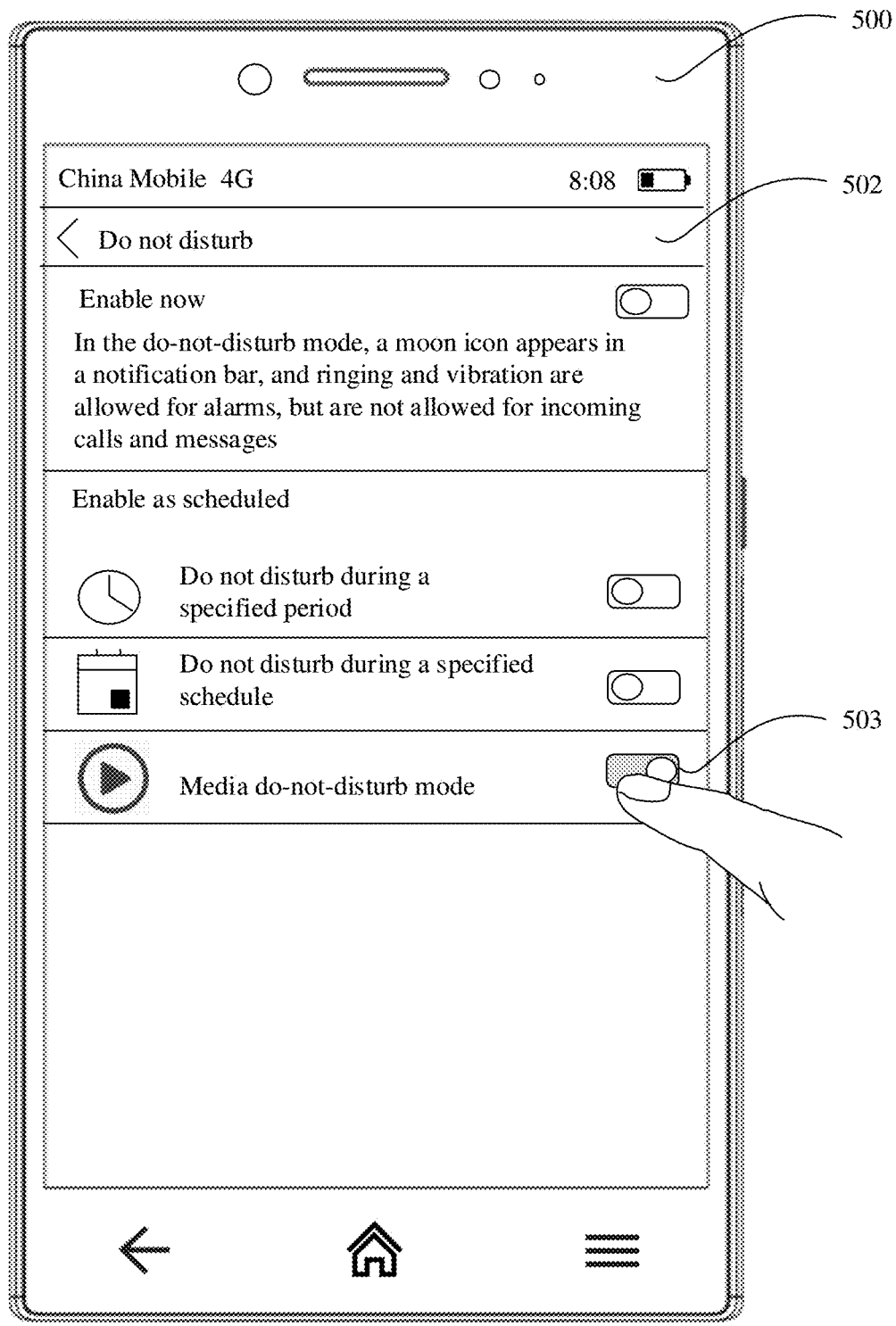
FIG. 5B is a schematic diagram of setting an app in a terminal according to an embodiment.
Figure 5C:
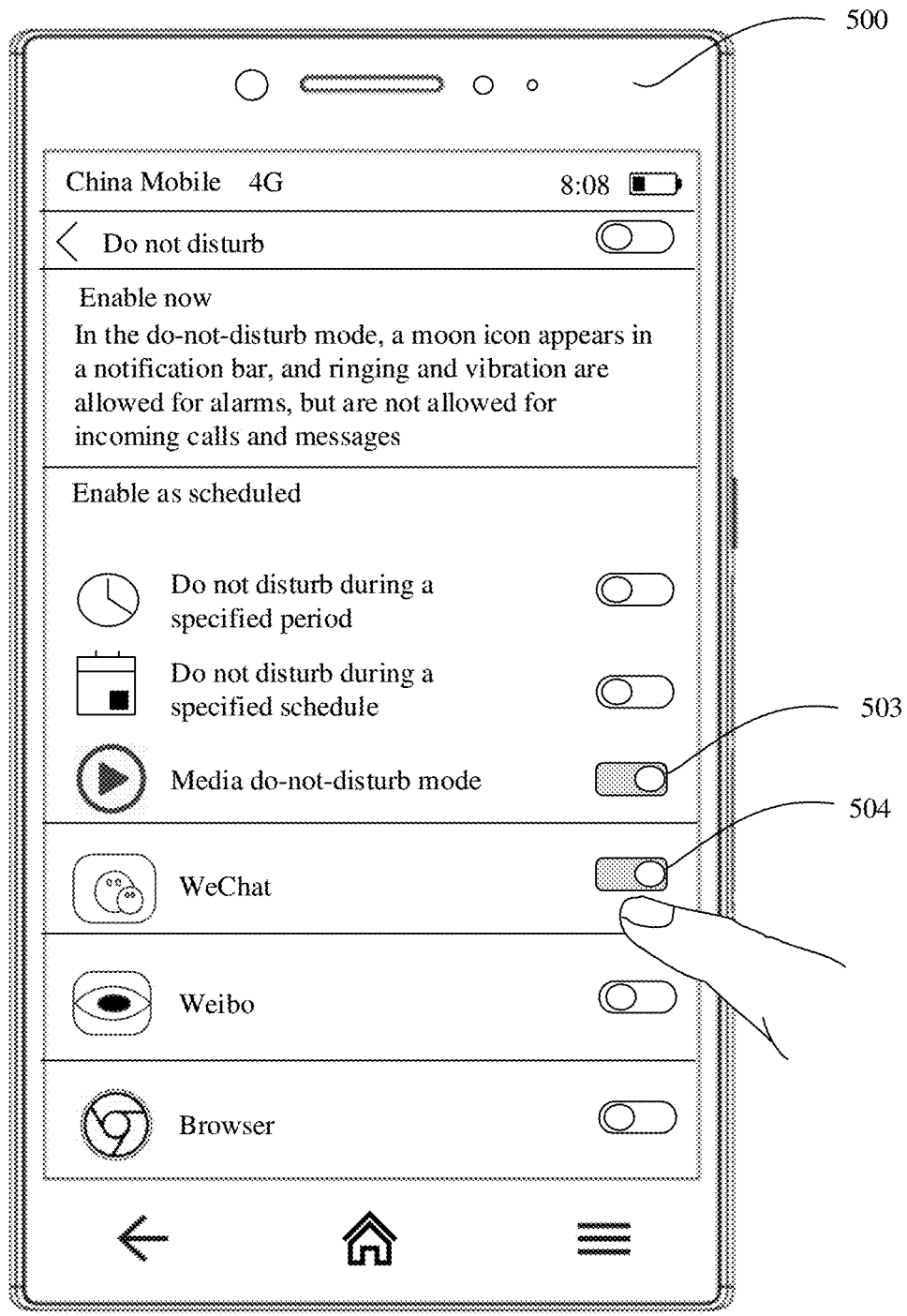
FIG. 5C is a schematic diagram of setting an app in a terminal according to an embodiment.

For example, FIG. 5A to FIG. 5C are schematic diagrams of screens of the setting options on the mobile phone. As shown in FIG. 5A, a "do-not-disturb" option 501 is displayed in the setting options of the mobile phone 500. After the user activates the "do-not-disturb" option 501, a "do-not-disturb" setting screen 502 is displayed. Refer to FIG. 5B.

As shown in FIG. 5B, an on-off control 503 of a "media do-not-disturb mode" is displayed on the "do-not-disturb" setting screen 502. The mobile phone 500 disables the media do-not-disturb mode by default; in other words, a slider in the on-off control 503 is on the left. After the user triggers the on-off control 503, the slider in the on-off control 503 moves rightward, and a color is displayed on the left side of the on-off control 503, that is, the mobile phone 500 enables the media do-not-disturb mode. The do-not-disturb mode takes effect on applications that have a media playing function and that are installed on the mobile phone 500. These applications may be selected by the user or, alternatively, may be obtained by the mobile phone 500 based on function classification of applications.

In an embodiment, after the user triggers the on-off control 503 of the media do-not-disturb mode, a display screen of the mobile phone 500 may further display an interface shown in FIG. 5C. In FIG. 5C, the mobile phone 500 displays icons of apps (apps having a media automatic playing function) installed on the mobile phone 500, and the user may select an app for which the media do-not-disturb mode is enabled. For example, when the user selects WECHAT, the user may trigger an on-off control 504 of WECHAT, in other words, the on-off control 504 of WECHAT is in an on state. When the mobile phone 500 runs WECHAT, WECHAT is in the media do-not-disturb mode. For another example, if the user does not select a browser, when the mobile phone 500 runs the browser, media may be automatically played.

In this embodiment, there may be a plurality of apps having the media automatic playing function, for example, WECHAT, the browser, TIKTOK, microblog, FACEBOOK, and TWITTER.

Additionally, the user may also enable the media do-not-disturb mode of the mobile phone in another manner, and this is not limited in this embodiment. For example, a shortcut icon for setting the media do-not-disturb mode may be displayed on the display screen of the mobile phone. When the user triggers the shortcut icon, the mobile phone enables the media do-not-disturb mode.

In an example, after detecting an operation of enabling the media do-not-disturb mode, the mobile phone determines that the mobile phone is in the media do-not-disturb mode.

In another example, the mobile phone may detect a status of the on-off control corresponding to the media do-not-disturb mode in the setting options, and if the on-off control is in an enabled state, the mobile phone determines that the mobile phone is in the media do-not-disturb mode.

In this embodiment, the mobile phone may store a media do-not-disturb list. When detecting that the user enables the media do-not-disturb mode for some apps, the mobile phone adds app package names of these apps to the media do-not-disturb list. After detecting an operation of starting an app, the mobile phone may determine whether an app package name of the app exists in the media do-not-disturb list. If the app package name of the app exists in the media do-not-disturb list, when running the app, the mobile phone performs processing by using the do-not-disturb method provided in the embodiments, to reduce a case in which the app automatically plays media. If the app package name of the app does not exist in the media do-not-disturb list, when running the app, the mobile phone performs processing in a mode in the prior art, namely a media automatic playing mode.

S402: The mobile phone obtains an input event.

For example, when running the software program and/or the module in the IMS at the framework layer, the processor 130 in the mobile phone reads an original input event from the kernel layer, and then processes the read original input event to obtain an input event that includes more information, to obtain the input event.

It can be understood from the foregoing content that the user may trigger an input operation by using an input device such as a touchscreen, a microphone, or a headset, to generate a corresponding hardware interrupt. The kernel layer of the operating system processes the input operation into the original input event for storage. The framework layer reads the original input event, processes the original input event into the input event that includes more information, and distributes the input event to an interested application. There may be a plurality of input operations. Using the touchscreen as an example, the input operation may be a tap or slide operation performed by the user on the touchscreen. Using the microphone as an example, the input operation may be voice input of a "play" instruction that is input by the user by using the microphone. Using the headset as an example, the input operation may be an operation triggered by using the headset, such as play, pause, volume increase, or volume decrease. In other words, an input event corresponding to the input operation that may trigger a playback activity is an input event that may trigger the playback activity.

It should be noted that, in this embodiment, unless otherwise specified, the "input event" is the input event that is obtained by processing the original input event and that includes more information.

S403: The mobile phone identifies a first input event in the obtained input events.

For example, when running the software program and/or the module in the IMS at the framework layer, the processor 130 in the mobile phone may continue to identify the obtained input events after obtaining the input events. Alternatively, a first algorithm module that is different from the IMS is disposed in the mobile phone to identify the obtained input events. In this case, the processor 130 in the mobile phone runs a software program and/or a module corresponding to the first algorithm module, to perform the following operations: The first algorithm module obtains the input events from the IMS, and then identifies the obtained input events. To reduce power consumption, when the mobile phone is not in the media do-not-disturb mode, the first algorithm module may not be run. After detecting that the mobile phone is currently in the media do-not-disturb mode, the mobile phone starts to run the first algorithm module.

In an example, each time after obtaining an input event, the first algorithm module may identify whether the input event is the first input event, or may identify, after obtaining a plurality of input events, whether the plurality of input events include the first input event.

The first input event is an input event corresponding to a playing operation of the user. A response of an application to an input event is generally determined by the application (especially a third-party application other than a system application). In other words, the application usually determines which operations of the user are playing operations. Therefore, in the prior art, it is generally difficult for the framework layer to determine, by using one input event, whether the input event corresponds to the playing operation of the user, in other words, determine whether the application responds to the input event to play media. Therefore, in this embodiment, some input events that usually correspond to the playing operation of the user are determined as first input events, for example, an input event corresponding to the voice input of the "play" instruction that is input by using the microphone, an input event that corresponds to a play instruction and that is triggered by using the headset, and an input event corresponding to a touch operation (for example, a tap operation on the touchscreen) triggered by using the touchscreen. A preset event list may include at least one first input event. The preset event list may be a list that is obtained by a mobile phone manufacturer based on an experiment or experience and then stored in the mobile phone at delivery of the mobile phone. Further, the preset event list may alternatively be a user-defined list that can be updated. For example, the user may add, to the preset event list, an input event that corresponds to a playing operation and that is frequently used by the user.

For example, after being run, the first algorithm module may identify, by comparing the obtained input events with the preset event list, whether the first input event exists in the obtained input events. If an input event obtained by the first algorithm module matches the preset event list, in other words, the input event obtained by the first algorithm module exists in the preset event list, the first algorithm module identifies that the input event is the first input event.

For example, there may be two cases in which the first algorithm module identifies the first input event in the obtained input events. In a first case, the mobile phone does not identify the first input event; in other words, a quantity of the first input event is zero. In a second case, the mobile phone identifies the first input event; in other words, the quantity of the first input event is not zero. In the first case, because the first input event does not exist, if an application that has the media automatic playing function in the mobile phone creates a player in a running process, it is determined that the activity is an automatic playback activity and playing of media may be directly paused. In the second case, S404 to S410 may continue to be performed.

S404: The mobile phone records first information of the first input event. The first information includes an app package name and a process ID of an app to which the input event is distributed, a distribution time point, and the like.

For example, when running the software program and/or the module in the IMS at the framework layer, the processor 130 in the mobile phone may record the app package name and the process ID of the app to which the first input event is distributed, the distribution time point, and the like.

In an example, the mobile phone may record the first information in a form of a table. Refer to Table 1.

TABLE 1

| First input event | App package name of the app to which the first input event is distributed | Process ID | Distribution time point |
| --- | --- | --- | --- |
| Tap event on the touchscreen | app 1 | ID 1 | 10:10:10 |
| Language information containing a keyword "play" | app 2 | ID 2 | 10:20:20 |

S405: The mobile phone creates a player in a running process.

In this embodiment, when a media playing condition is met, the mobile phone creates the player. There may be a plurality of conditions. For example, when the mobile phone runs a video playing app, and a video playing window on a display interface of the app is partially or completely displayed, the mobile phone creates a player to play media. Alternatively, when the mobile phone receives an SMS message or an incoming call from another mobile phone, the mobile phone also creates a player to play an incoming call ringtone or an SMS ringtone. Alternatively, when the user browses an app interface or a web page, and an advertisement playing window or the like is popped up, the mobile phone also creates a player. In an actual process, there may be another reason for creating a player. This is not limited in this embodiment.

For example, the processor 130 in the mobile phone invokes the media player interface at the framework layer and runs the media player interface to complete player creation. Also, the mobile phone may alternatively create the player in another manner. This is not limited in this embodiment.

S406: The mobile phone records second information. The second information includes an app package name and a process ID of an app on which the player is created, a creation time point, and the like.

For example, the processor 130 in the mobile phone invokes the media player interface at the framework layer and runs the media player interface to complete player creation. In this case, the media player also needs to record related information, namely, the second information, about creating the player. Then, the processor 130 in the mobile phone continues to invoke the playback activity monitor interface at the framework layer, and the processor 130 sends the second information in the media player to the playback activity monitor.

S407: The mobile phone determines whether a second input event exists in the first input event, where a distribution time point of the second input event is earlier than the creation time point, and a time difference between the distribution time point and the creation time point is less than a preset duration; if the second input event exists in the first input event, S408 is performed; or if the second input event does not exist in the first input event, S410 is performed.

In other words, the second input event is one or more of the first input events identified in S402 to S404.

It can be understood from the foregoing content that the playback activity monitor stores the related information, namely, the second information, about creating the player, and the IMS stores the first information of the first input event. Therefore, when running the playback activity monitor at the framework layer, the processor 130 in the mobile phone sends the first information stored in the IMS to the playback activity monitor, and implements, by using the playback activity monitor, a process of determining whether the second input event exists in the first input event.

In an example, after determining the creation time point for creating the player, the mobile phone may search the table 1 for the second input event based on the creation time point. In addition, there may be two cases in which the mobile phone searches the table 1 for the second input event. In a first case, the second input event is not found. In a second case, the second input event is found. In the first case, because a quantity of the second input event is zero, if an application that has the media automatic playing function in the mobile phone creates a player in a running process, it is determined that the activity is an automatic playback activity. In the second case, S408 to S410 may continue to be performed.

In this embodiment, a value of the preset duration may be determined based on an actual situation, for example, may be determined based on an operation rate of the terminal. When the operation rate is relatively high, the preset duration may be set to be relatively short. When the operation rate is relatively low, the preset duration may be set to be relatively long.

S408: The mobile phone determines whether an app package name of an app to which the second input event is distributed is the same as the app package name in the second information, and/or determines whether a process ID of an app to which the second input event is distributed is the same as the process ID in the second information; if the two app package names are the same, and/or the two process IDs are the same, S409 is performed; or if the two app package names are not the same, and/or the two process IDs are not the same, S410 is performed.

For example, the processor 130 in the mobile phone performs S408 by using the playback activity monitor at the framework layer. Alternatively, a second algorithm module different from the playback activity monitor is disposed in the mobile phone to perform S408. In this case, when running the software program and/or the module corresponding to the first algorithm module, the processor 130 in the mobile phone obtains the second information from the playback activity monitor, obtains the first information from the IMS, and then performs S408. To reduce power consumption, the second algorithm module is in a non-running state by default. When the mobile phone detects that the mobile phone is in the media do-not-disturb mode, the mobile phone starts to run the second algorithm module.

It can be understood from the foregoing content that one app corresponds to one or more processes. Therefore, the following provides descriptions in two cases. In a first case, one app corresponds to one process. In a second case, one app corresponds to a plurality of processes.

In the first case, because one app corresponds to one process, the mobile phone only needs to determine whether the package name of the app to which the second input event is distributed is the same as the app package name in the second information, or the mobile phone only needs to determine whether the process ID of the app to which the second input event is distributed is the same as the process ID in the second information.

In the second case, because one app corresponds to a plurality of processes, after determining whether the package name of the app to which the second input event is distributed is the same as the app package name in the second information, the mobile phone may further determine whether the process ID of the app to which the second input event is distributed is the same as the process ID in the second information. In this manner, it may be relatively accurately located that it is a same process in which the app on which the player is created and the app to which the second input event is distributed are the same app.

S409: The mobile phone plays media.

For example, the processor 130 in the mobile phone invokes the media player start interface (not shown in FIG. 3) at the framework layer, and triggers, by using the media player start interface, the display unit 160 to display a video included in the media, and/or triggers the loudspeaker 172 to play an audio included in the media, to implement media playing.

Additionally, to improve accuracy, before playing the media, the mobile phone may further output first prompt information. The first prompt information is used to prompt the user whether to confirm playing the media. In this manner, it may be further determined that a media playback activity is actively triggered by the user, to improve accuracy.

Figure 6:
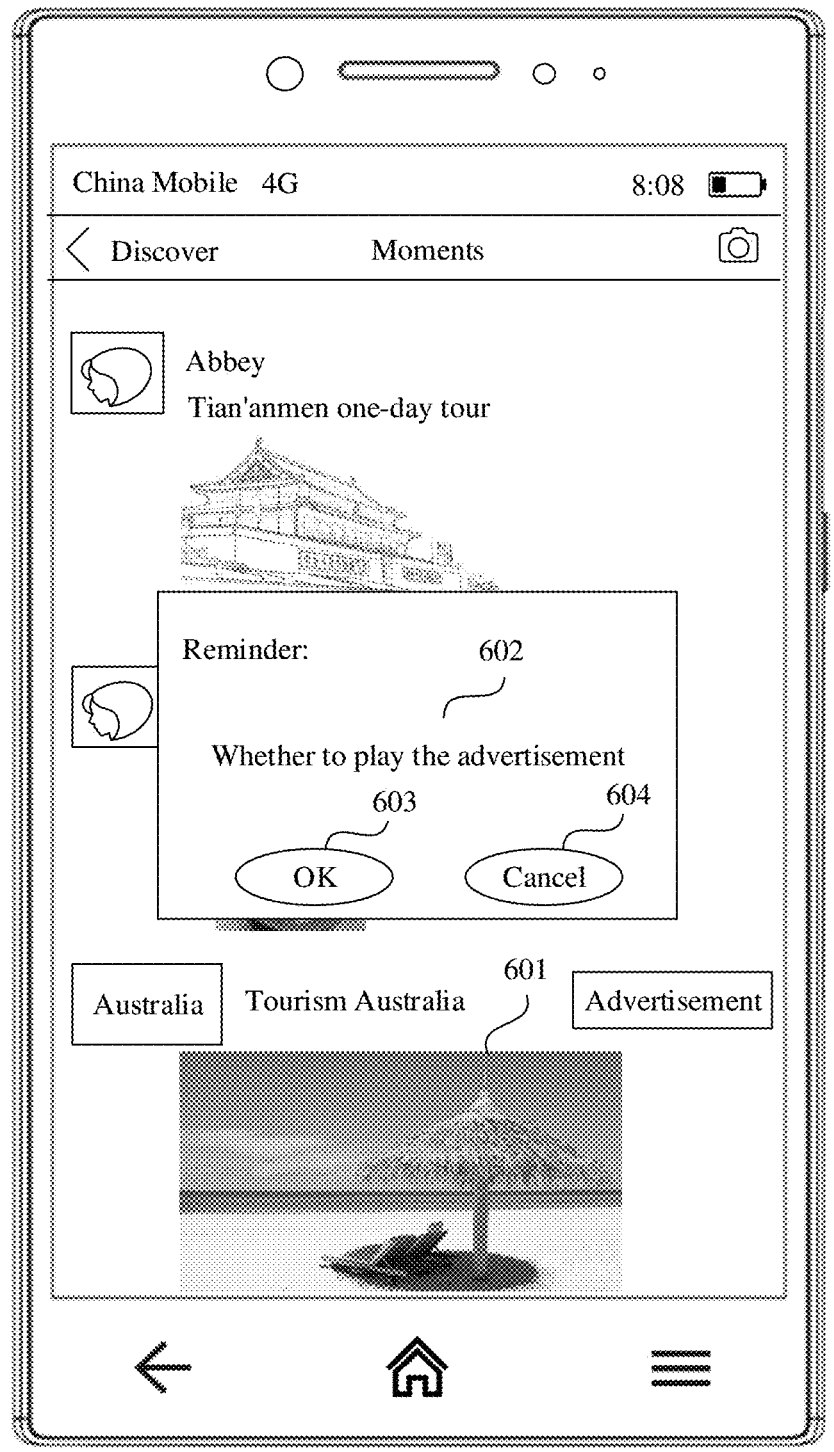
FIG. 6 is a schematic diagram of displaying first prompt information by a terminal according to an embodiment.

For example, FIG. 6 is a schematic diagram of the first prompt information displayed by the mobile phone in this embodiment. In FIG. 6, the terminal is a mobile phone as an example, and WECHAT in the mobile phone is used as an example. As shown in FIG. 6, a display interface of WECHAT Moments displayed on the mobile phone includes an advertisement playing window 601, prompt information 602, an "OK" control 603, and a "cancel" control 604. The prompt information 602 is "Reminder: whether to confirm advertisement playing". When the user triggers the "OK" control 603, an advertisement is played in the advertisement playing window 601. When the user triggers the "cancel" control 604, the mobile phone pauses or stops playing the advertisement.

In this embodiment, S402 to S404 are used to determine whether the first input event exists in the obtained input events, and when the first input event exists, obtain the first information in the obtained input events. S402 to S404 may be sequentially performed. S405 and S406 are used to determine whether the mobile phone creates a player, and when the mobile phone creates the player, obtain the second information about creating the player. S405 is performed before S406. S402 to S404 may be sequentially or simultaneously performed with S405 and S406. S404 and S406 are performed before S407 and S408.

It may be understood that S402 to S408 are merely examples of one implementation, and an objective of S402 to S408 is to determine whether an input event in the obtained input events causes creation of a player. Considering that after the user performs a playing operation on an interface of an application, an input event corresponding to the playing operation is distributed to the application, and the application triggers creation of a player in response to the input event, whether an input event meets the following conditions may be determined by determining whether an input event in the obtained input events causes the creation of the player: (1) the input event is the first input event; (2) a distribution time point of the input event is earlier than a creation time point of the player, and a time difference between the two is less than preset duration (for example, whether a second input event exists is determined in S407); and (3) an app to which the input event is distributed is the same as an app on which the player is created (for example, in S408, the app package name and/or the process ID of the app to which the second input event is distributed are/is compared with the app package name and/or the process ID of the app on which the player is created).

When a target input event that meets the foregoing three conditions is found from the obtained input events, it may be considered that the target event causes the app to create a player, and then S409 is performed. If one of the three conditions is not met, it is considered that the creation of the player is not caused by the playing operation of the user, it may be caused by application automatic playing, or by another reason, and then S410 is performed.

It may be understood that, in addition to S402 to S408, other sequences or steps may be used to achieve the objective of the foregoing determining. This is not limited in this embodiment.

S410: The mobile phone pauses playing the media.

For example, the processor 130 in the mobile phone invokes the media player pause interface (not shown in FIG. 3) at the framework layer, to pause playing the media. Alternatively, the media player stop interface (not shown in FIG. 3) at the framework layer is invoked to stop playing the media.

In an actual operation process, the media may include an image and/or a sound. Therefore, when pausing playing the media, the mobile phone may choose to pause playing the image and/or the sound. For example, when only pausing playing the sound, the mobile phone may mute the loudspeaker or set the volume of the loudspeaker to 0.

For example, the mobile phone may further display, by using the display screen, that the media is in a paused state or a stopped state, to prompt the user that the playing of the media is paused or stopped.

In an example, the mobile phone may display a pause control or a stop control.

Figure 7:
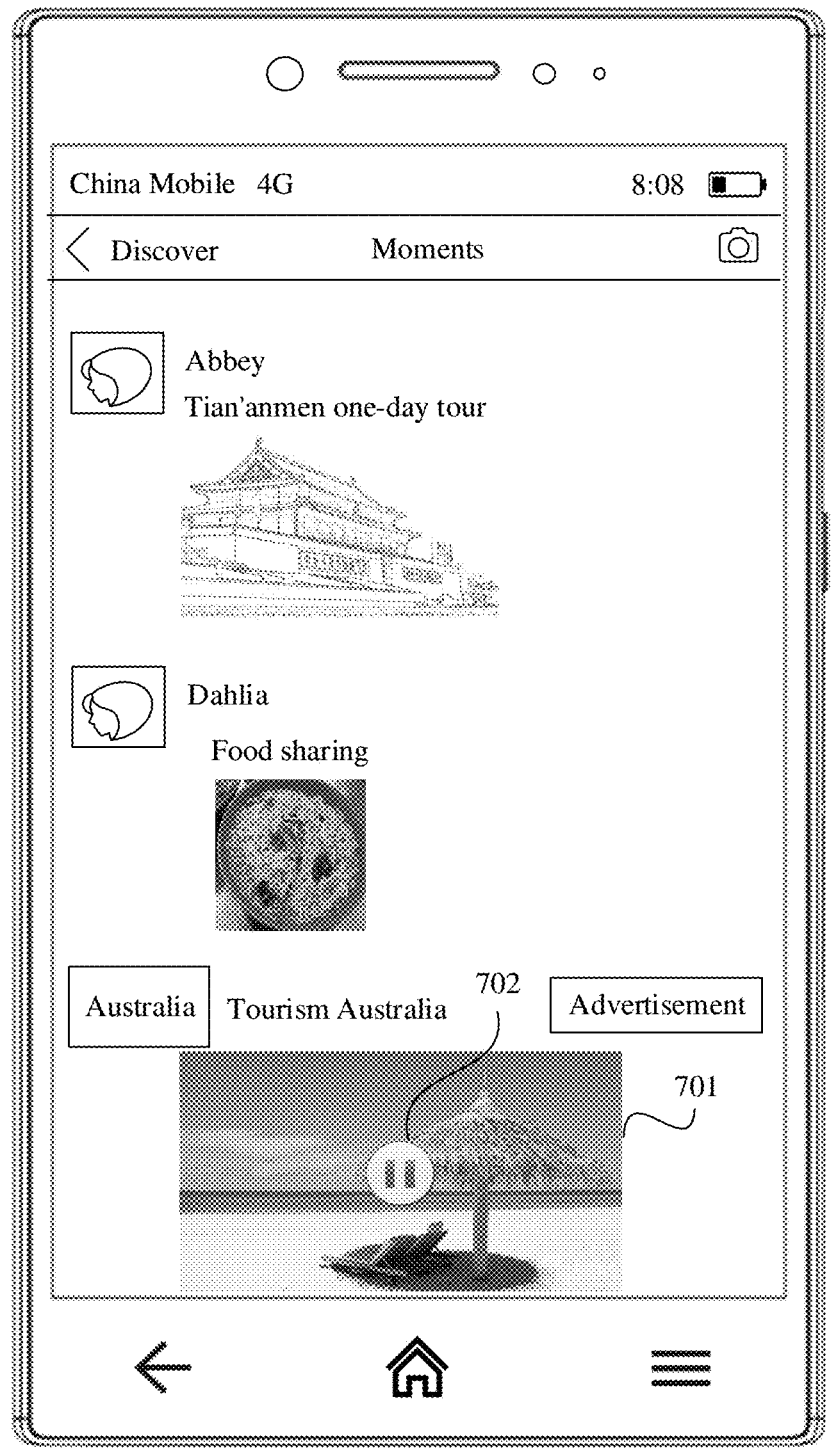
FIG. 7 is a schematic diagram of displaying, by a terminal, that media is in a paused state according to an embodiment.

Refer to FIG. 7. In FIG. 7, the terminal is a mobile phone as an example, and WECHAT in the mobile phone is used as an example. As shown in FIG. 7, WECHAT Moments displayed on the display screen of the mobile phone includes an advertisement playing window 701, and the advertisement playing window 701 includes a pause control 702.

In another example, the mobile phone may display a black screen state in a media playing window on the display screen.

In this manner, the mobile phone displays the black screen state in the media playing window, to prompt the user that the playing of the media is paused or stopped. Therefore, the mobile phone may not obtain the media (for example, the media is a video that may be a network video or a local video). In this manner, computing time and resources of the mobile phone can be saved, and efficiency can be improved.

Also, the mobile phone may also display information such as an image or a text in the media playing window on the display screen.

In this embodiment, to beautify the media playing window, the mobile phone may obtain a frame of an image, and then display the obtained frame of an image in the media playing window. The mobile phone displays the pause control on the image, so that the user knows that the media is currently in a pause playing state.

The frame of an image obtained by the mobile phone may be a frame of an image in the media. For example, the media is a video, and the mobile phone may obtain a frame of an image in the video (a network video or a local video). For example, a first frame of an image of the video may be obtained. Alternatively, the frame of an image obtained by the mobile phone may be a frame of an image defined by the mobile phone. For example, the mobile phone may obtain, from a network or locally, a frame of an image irrelevant to the media.

In addition, the mobile phone may directly pause playing the media, or may output second prompt information to prompt the user whether to automatically play the media.

Figure 8:
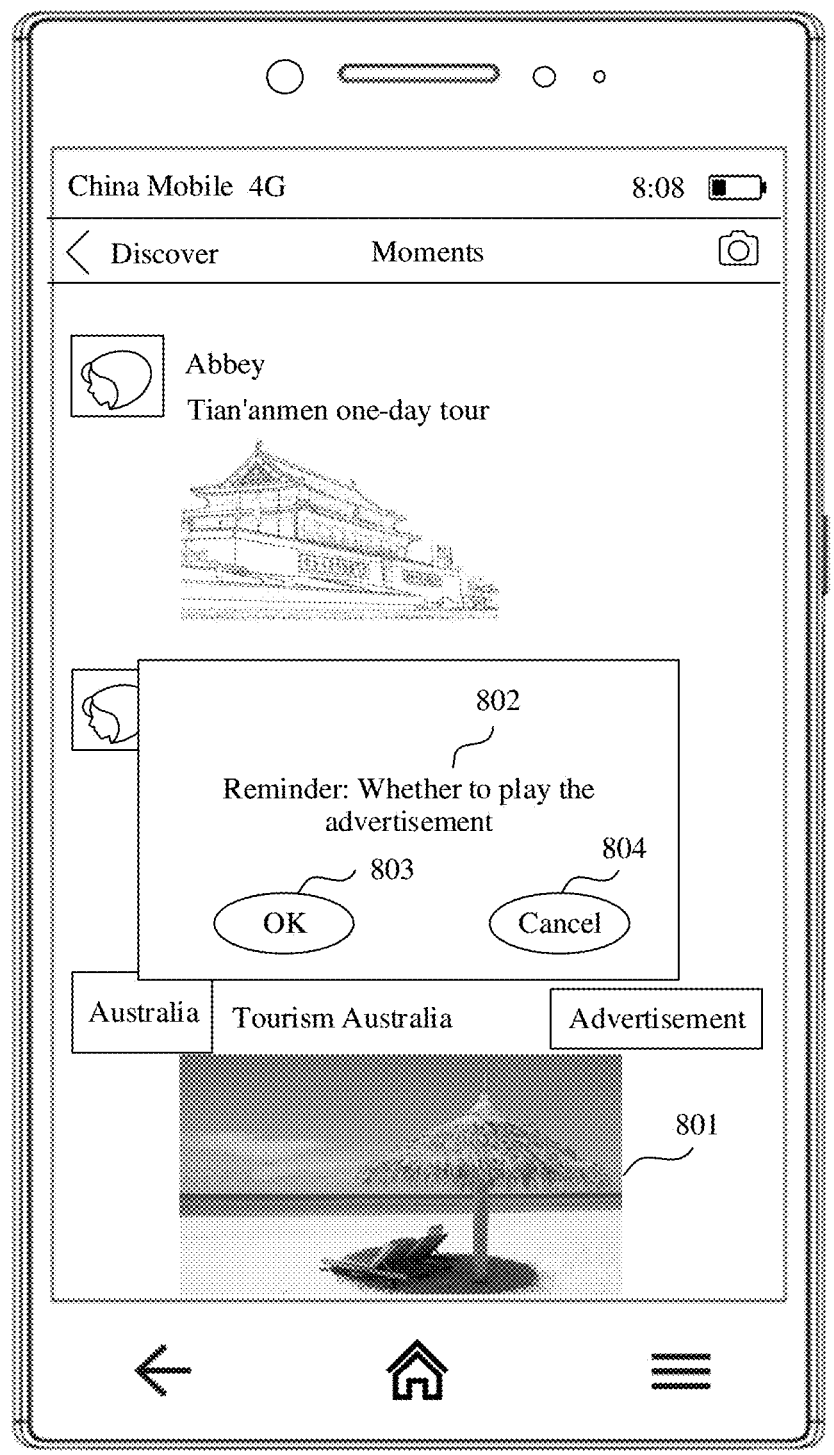
FIG. 8 is a schematic diagram of displaying second prompt information by a terminal according to an embodiment.

For example, FIG. 8 is a schematic diagram of the second prompt information displayed by the mobile phone in this embodiment. In FIG. 8, the terminal is a mobile phone as an example, and WECHAT in the mobile phone is used as an example. As shown in FIG. 8, a display interface of WECHAT Moments displayed on the mobile phone includes an advertisement playing window 801, prompt information 802, an "OK" control 803, and a "cancel" control 804. The prompt information 802 is "Reminder: whether to play an advertisement". When the user triggers the "OK" control 803, an advertisement is played in the advertisement playing window 801. When the user triggers the "cancel" control 804, the mobile phone pauses or stops playing the advertisement.

It can be known from the foregoing content, when receiving information or an incoming call from another terminal, the mobile phone may also create a player to play a system notification tone (an SMS ringtone or an incoming call ringtone).

In this case, because a time point at which the mobile phone receives information or an incoming call from another terminal is uncertain, and duration in which the user operates an SMS application and a phone application in the mobile phone is relatively short, there is a relatively high probability that a determining result in S408 is that the two app package names are not the same, and/or the two process IDs are not the same, and there is a relatively high probability that the mobile phone does not play the system notification tone. In this manner, when the mobile phone is in the media do-not-disturb mode, an incoming call ringtone, an SMS ringtone, or the like may not be played.

In an example, when the determining result in S408 is that the two app package names are not the same, and/or the two process IDs are not the same, the mobile phone may further determine, by determining playing duration of the media, whether to play the media. Generally, the SMS ringtone is a file locally stored in the mobile phone and has relatively short playing duration. The mobile phone can record the playing duration of the SMS ringtone. When the mobile phone receives an SMS message from another mobile phone, after creating a player, the mobile phone determines whether playing duration of an SMS ringtone to be played by the player is less than preset duration. If the playing duration of the SMS ringtone to be played by the player is less than the preset duration, it is determined that the SMS ringtone to be played by the player is an SMS ringtone, and the SMS ringtone is played. If the playing duration of the SMS ringtone to be played by the player is greater than the preset duration, the playing of the SM ringtone is paused. In this manner, even if the mobile phone is in the media do-not-disturb mode, when the mobile phone receives information sent by another mobile phone, for example, an SMS message, a WECHAT message, or a QQ message, the mobile phone may prompt the user in time that a message is received.

It can be understood from the foregoing description that according to the do-not-disturb method provided in this embodiment, the terminal can avoid automatic playing of media, save data traffic, reduce power consumption, and improve user experience.

In the do-not-disturb method provided in the embodiment shown in FIG. 4A and FIG. 4B, after the mobile phone pauses media playing, in other words, after S410, the user may trigger media playing. For example, the user may trigger displaying of the pause control in the media playing window to play media. When the mobile phone is running, a player may be created for a plurality of times. For example, in a process of browsing an app interface or a web page, to browse more content, the user usually slides up the app interface or the web page. In the process of sliding up, a new media playing window may continuously appear on the app interface or the web page. Each time a media playing window appears, a player is created. Alternatively, the mobile phone may continuously create a player when continuously receiving an SMS message or an incoming call sent by another mobile phone. Each time the mobile phone creates a player, the do-not-disturb procedure shown in FIG. 4A and FIG. 4B may be performed once.

In the embodiment shown in FIG. 4A and FIG. 4B, that the mobile phone identifies the first input event (S403 and S404) and that the mobile phone creates the player (S405 and S406) may be two independent processes, and there is no limitation on a sequence between the two processes. For example, the mobile phone may first create a player, and then determine whether a first input event that matches the event of creating the player exists. Alternatively, the mobile phone may first identify the first input event, and then determine whether an event of creating the player that matches the first input event exists. Further, S402 to S404 may be continuously performed. As long as the mobile phone is in the media do-not-disturb mode, the mobile phone continuously obtains input events, identifies the first input event, and records a distribution process of the first input event. Once the mobile phone creates a player, S405 to S410 are performed.

If the mobile phone creates the player but does not identify the first input event from the obtained input events (in other words, S404 is not performed), because the first input event does not exist, the mobile phone does not need to perform S407 to S410, and directly pauses media playing. Additionally, in this case, the mobile phone may also continue to perform S407 to S410. However, because the quantity of the first input event is zero, an execution result is still that the mobile phone pauses media playing.

If the first input event is identified, but the mobile phone does not create a player (in other words, S405 and S406 are not performed), the mobile phone does not play media. Therefore, the mobile phone may not need to perform S407 to S410.

Generally, the mobile phone performs at least two processes in a process of creating a player. In a first process, the mobile phone receives request information for creating the player, and then prepares for creating the player based on the request information. In a second process, the mobile phone creates the player. A video is used as an example. In the first process, when a player needs to be created on an app in the mobile phone, the app generates request information. The request information includes an app package name, a video address (a streaming media address or a local video address), a video size, or the like. The mobile phone sets a video tag based on the request information, and the set video tag includes the app package name, the video address, or the video size. After completing these preparation works, the mobile phone creates the player based on the video tag, in other words, performs the foregoing second process.

Figure 9A:
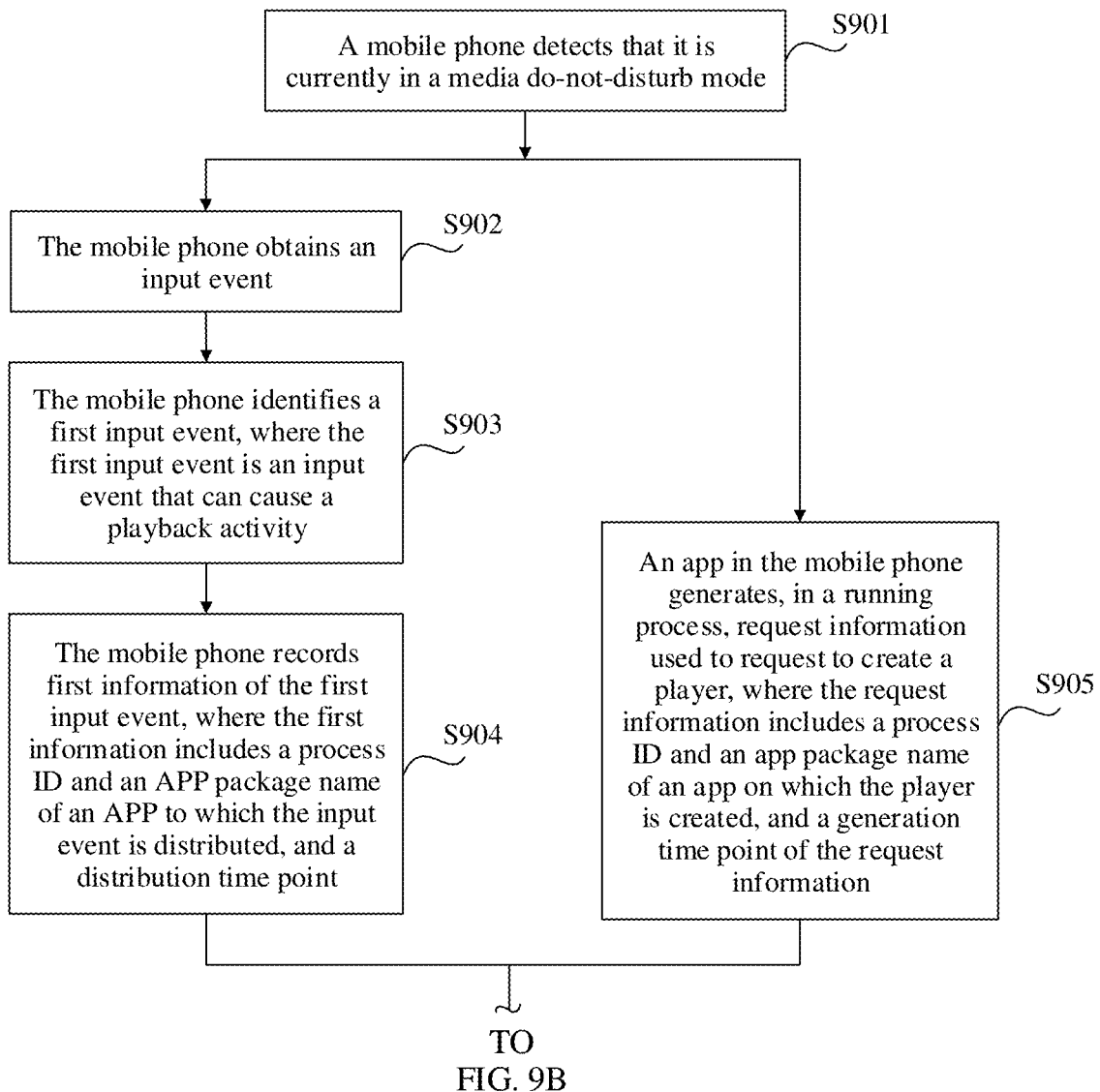
FIG. 9A and FIG. 9B are a schematic diagram of displaying second prompt information by a terminal according to an embodiment.
Figure 9B:
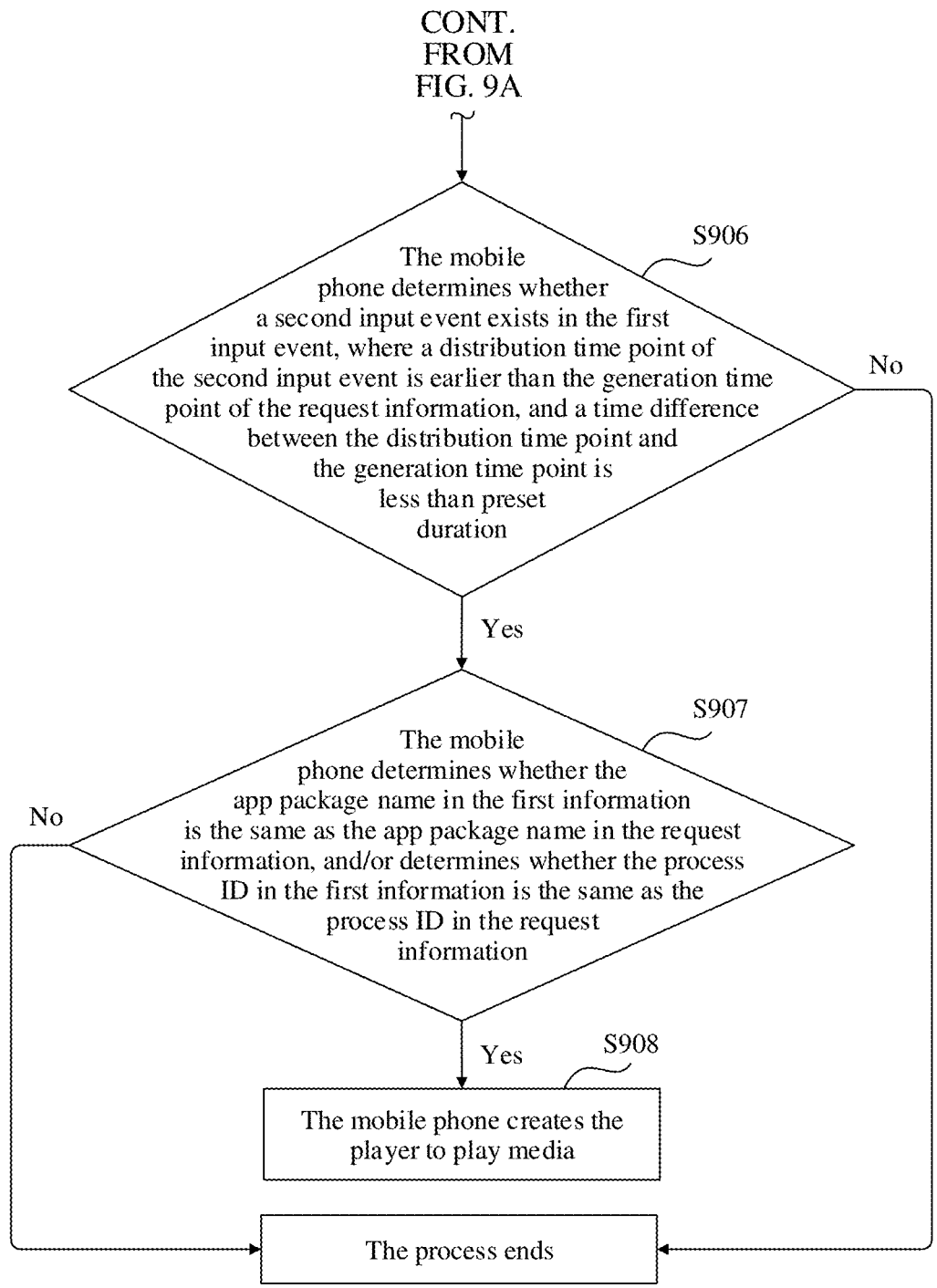

The embodiment shown in FIG. 4A and FIG. 4B occurs in or after the second process, in other words, the mobile phone has created the player. For a procedure, refer to the foregoing description of the embodiment shown in FIG. 4A and FIG. 4B. The following describes another embodiment. This embodiment occurs in the first process or occurs after the first process and before the second process. The app in the mobile phone generates, in a running process, the request information used to request to create the player. The mobile phone determines whether generation of the request information is triggered by an input event in the obtained input events. If the generation of the request information is triggered by an input event in the obtained input events, the mobile phone creates the player to play media. If the generation of the request information is not triggered by an input event in the obtained input events, the mobile phone does not create the player. Refer to FIG. 9A and FIG. 9B.

For S901 to S904, refer to S401 to S404 in the embodiment shown in FIG. 2. A difference from the embodiment shown in FIG. 4A and FIG. 4B lies in S905 to S908.

S905: An app in the mobile phone generates, in a running process, request information used to request to create a player, where the request information includes an app package name and a process ID of an app on which the player is created, a generation time point of the request information, and the like.

In this embodiment, in the running process of the app in the mobile phone, if there is a requirement for media playing, the request information used to request to create the player may be generated. For example, when a media playing condition is met, the app generates the request information for creating the player. For the media playing condition, refer to the foregoing content.

For example, when running a software program/a mode of the app, the processor 130 in the mobile phone generates the request information when the app has the requirement of media playing. The app sends the request information to the framework layer. When receiving the request information, the framework layer creates the player based on the request information. For example, the app sends the request information to an API interface at the framework layer. After the API interface sets a video tag based on the request information, the API interface invokes the media player interface, and sends the video tag to the media player. The media player creates the player based on the tag.

S906: The mobile phone determines whether a second input event exists in the first input event, where a distribution time point of the second input event is earlier than the generation time point of the request information, and a time difference between the distribution time point and the generation time point is less than preset duration; if the second input event exists in the first input event, S907 is performed; or if the second input event does not exist in the first input event, the player is not created.

For a description of S906, refer to S407 in the embodiment shown in FIG. 4A and FIG. 4B.

S907: The mobile phone determines whether the app package name in the first information is the same as the app package name in the request information, and/or determines whether the process ID in the first information is the same as the process ID in the request information, and if the package names are the same, and/or the process IDs are the same, S908 is performed, or if the package names are not the same, and/or the process IDs are not the same, the player is not created.

For a description of S906, refer to S408 in the embodiment shown in FIG. 4A and FIG. 4B.

S908: The mobile phone creates the player to play media.

If the mobile phone determines that the generation of the request information is triggered by an input event in the obtained input events, the mobile phone may create the player to play the media. For example, the processor 130 in the mobile phone invokes the media player interface at the framework layer and runs the media player interface to complete player creation. Then, the processor 130 in the mobile phone invokes the media player start interface at the framework layer, and triggers, by using the media player start interface, the display unit 160 to display a video included in the media, and/or triggers the loudspeaker 172 to play an audio included in the media, to implement media playing.

If the display screen of the mobile phone displays an interface of an application, and all or some parts of a media playing window in the interface is displayed, the application generates request information used to create a player. If the mobile phone determines that generation of the request information is not triggered by an input event in the obtained input events, the player may not be created. In this case, the mobile phone may display a black screen in the media playing window. If the user wants to play media, the user may trigger, by triggering a control in the media playing window, the mobile phone to create a player to play the corresponding media.

In the embodiment shown in FIG. 4A and FIG. 4B or in FIG. 9A and FIG. 9B, the user actively sets the mobile phone to be in the media do-not-disturb mode. However, in an actual application, the user may forget to set the media do-not-disturb mode, and directly open an app that has a media automatic playing function, such as WECHAT Moments or TIKTOK. For example, in a conference, if the user forgets to set the media do-not-disturb mode and directly starts an app, if the app automatically plays media, unnecessary troubles may be caused to the user. Therefore, in this embodiment, if the user does not set the media do-not-disturb mode, the mobile phone may actively prompt the user whether the media do-not-disturb mode needs to be set.

In a possible implementation, the mobile phone determines, based on a current scene mode of the mobile phone, whether to output third prompt information. The third prompt information is used to prompt the user to set the media do-not-disturb mode.

For example, the mobile phone determines that the mobile phone is currently in a mute mode, a conference mode, or the like. If the mobile phone detects that the user starts an app (an app having a media automatic playing function), the mobile phone may display the third prompt information. The third prompt information is used to prompt the user that the mobile phone is currently in the mute mode and whether to set the media do-not-disturb mode.

Also, the mobile phone may display the third prompt information while detecting that the user starts the app, or may display the third prompt information when the user starts the app and a media playing window appears on a display interface of the app. This is not limited in this embodiment.

Figure 10:
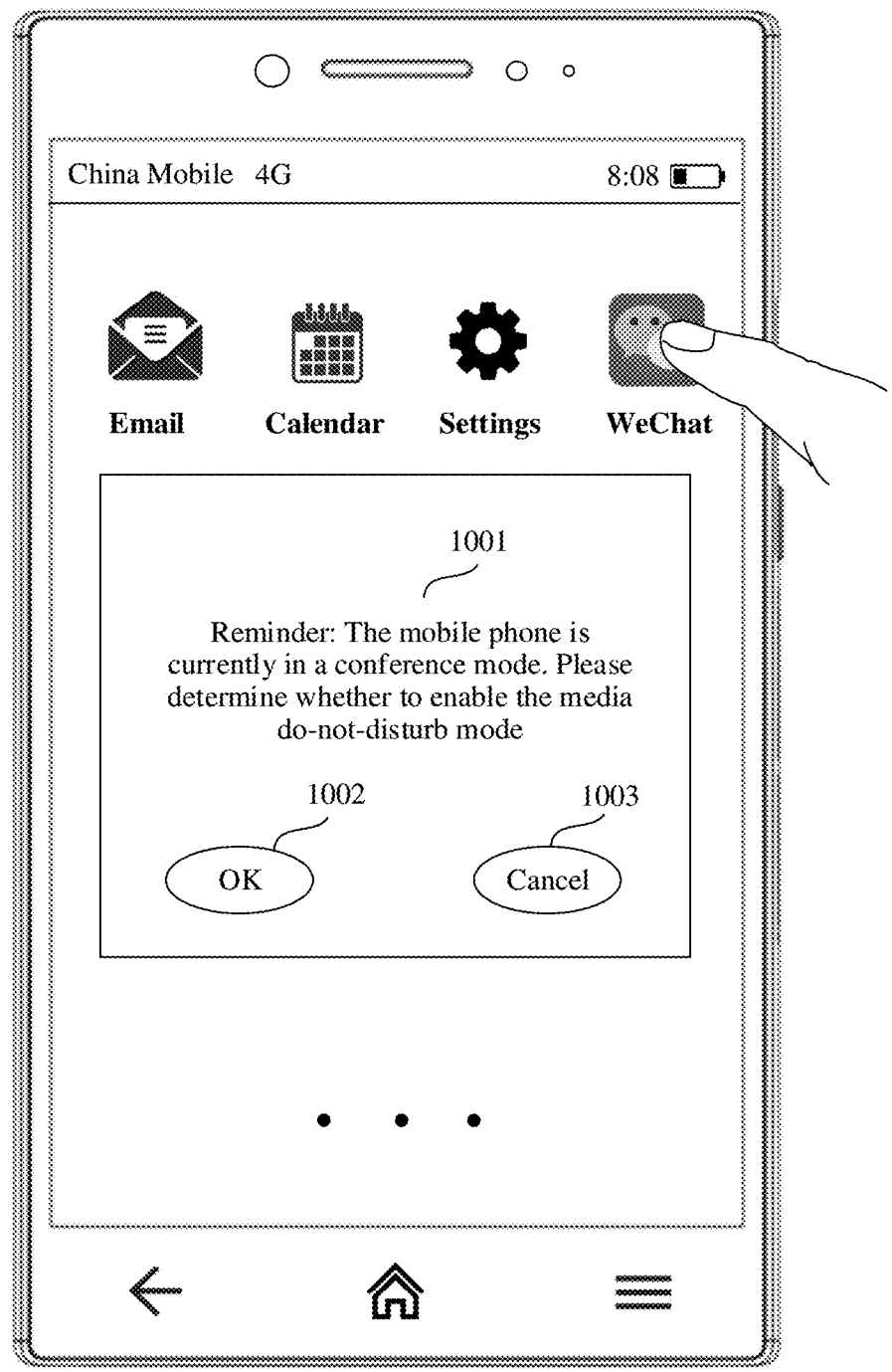
FIG. 10 is a schematic diagram of displaying third prompt information by a terminal according to an embodiment.

For example, FIG. 10 is a schematic diagram of displaying the third prompt information by the mobile phone. In FIG. 10, for example, the mobile phone displays the third prompt information in response to an operation that is triggered by the user and that is used to start WECHAT.

In FIG. 10, prompt information 1001 is displayed on the display screen of the mobile phone, which may be "The mobile phone is currently in the mute mode. Please determine whether to enable the media do-not-disturb mode". In FIG. 10, two controls are further displayed. If the user triggers a "cancel" control 1003, the mobile phone hides the prompt information and displays an app interface. If the user triggers an "OK" control 1002, the mobile phone automatically enables the media do-not-disturb mode. Alternatively, after the user triggers the "OK" control 1002, the display screen of the mobile phone jumps to a display interface for setting an app (for example, jumps to FIG. 5A or FIG. 5B), and then the user manually enables the media do-not-disturb mode.

In another possible implementation, the mobile phone may determine, according to a set schedule, whether to output the third prompt information. The third prompt information is used to prompt the user to set the media do-not-disturb mode.

For example, a schedule set by the user is: 10:00-12:00: conference. When detecting that a current system time is 10:00, the mobile phone may display the third prompt information, to prompt the user whether to set the media do-not-disturb mode. Alternatively, when the system time is between 10:00 and 12:00 (not including 10:00 and 12:00), the mobile phone displays the third prompt information while detecting an operation of starting an app (an app having a media automatic playing function) by the user. Alternatively, when the system time is between 10:00 and 12:00 (not including 10:00 and 12:00), the third prompt information is displayed when the media playing window appears on the display interface of the app displayed on the display screen of the mobile phone.

Figure 11:
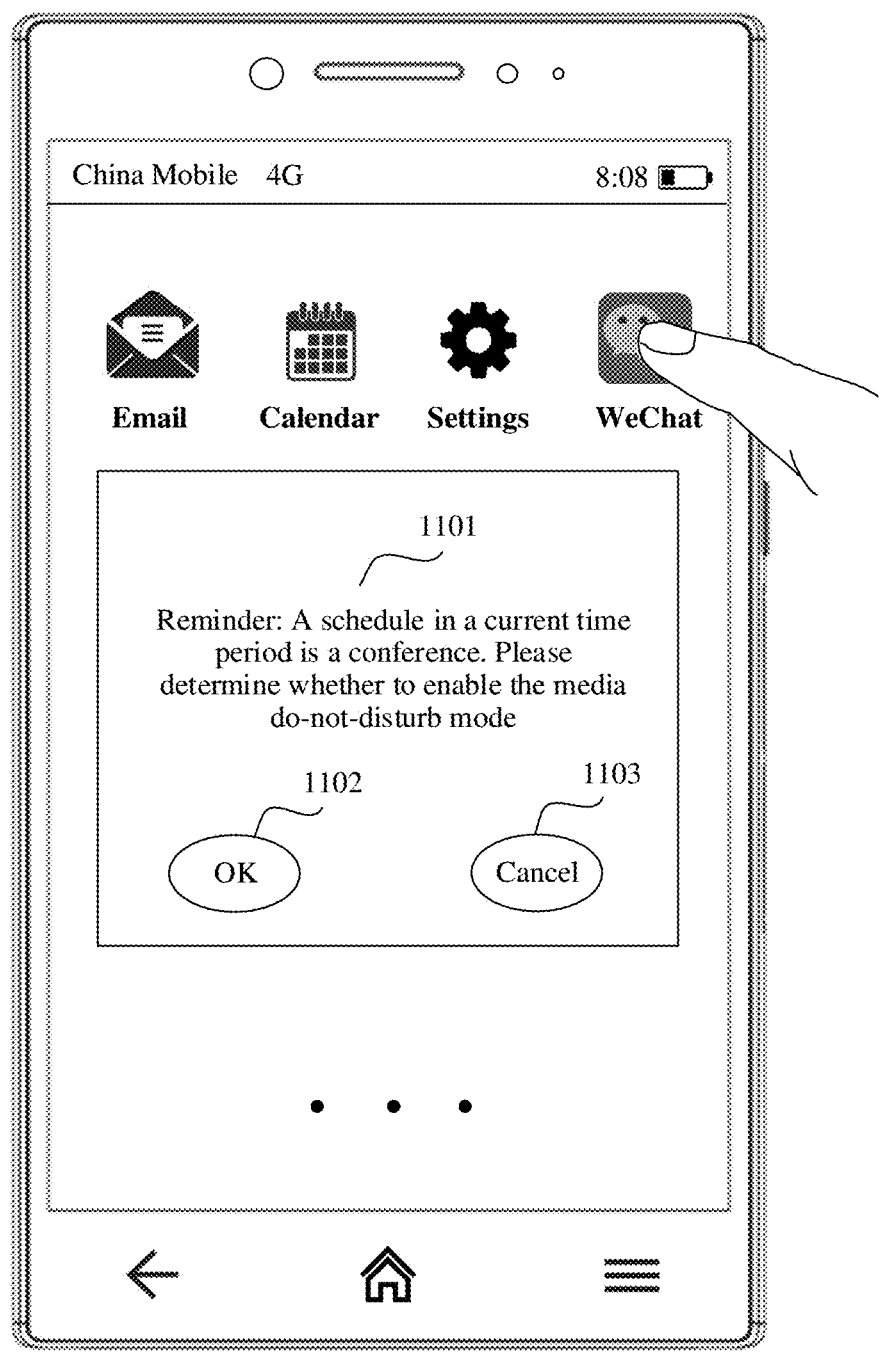
FIG. 11 is a schematic diagram of displaying third prompt information by a terminal according to an embodiment.

For example, FIG. 11 is a schematic diagram of displaying the third prompt information by the mobile phone. In FIG. 11, for example, the mobile phone displays the third prompt information in response to an operation that is triggered by the user and that is used to start WECHAT.

In FIG. 11, prompt information 1101 is displayed on the display screen of the mobile phone, which may be "A schedule in a current time period is a conference. Please determine whether to enable the media do-not-disturb mode". In FIG. 11, two controls are further displayed. If the user triggers a "cancel" control 1103, the mobile phone hides the prompt information and displays an app interface. If the user triggers an "OK" control 1102, the mobile phone automatically enables the media do-not-disturb mode. Alternatively, after the user triggers the "OK" control 1102, the display screen of the mobile phone jumps to a display interface for setting an app (for example, jumps to FIG. 5A or FIG. 5B), and then the user manually enables the media do-not-disturb mode.

In still another possible implementation, the mobile phone may determine, based on whether data traffic is in an enabled state, whether to output the third prompt information, where the third prompt information is used to prompt the user to set the media do-not-disturb mode.

For example, when the mobile phone detects an operation of starting an app (an app having a media automatic playing function) by the user, or when a media playing window appears on a display interface of the app displayed on the display screen of the mobile phone, if the mobile phone detects that the data traffic is currently in the enabled state, the mobile phone displays the third prompt information, to prompt the user to set the media do-not-disturb mode. This manner helps reduce data traffic waste.

Figure 12:
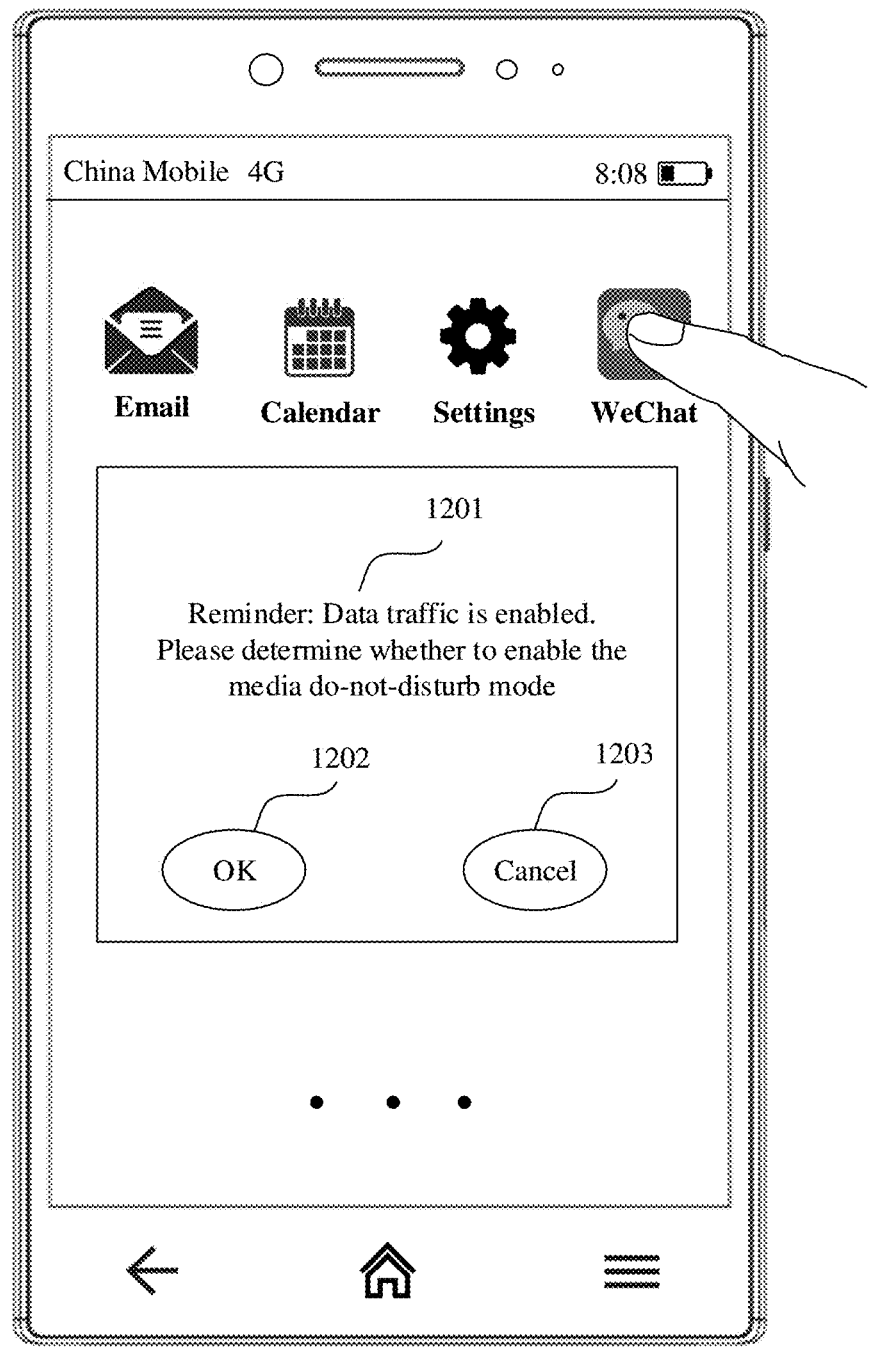
FIG. 12 is a schematic diagram of displaying third prompt information by a terminal according to an embodiment.

For example, FIG. 12 is a schematic diagram of displaying the third prompt information by the mobile phone. In FIG. 12, in response to an operation that is triggered by the user and that is used to start WECHAT, prompt information 1201 is displayed on the display screen of the mobile phone, which may be "Data traffic is turned on. Please determine whether to set the media do-not-disturb mode". If the user triggers a "cancel" control 1203, the mobile phone hides the prompt information and displays an app interface. If the user triggers an "OK" control 1202, the mobile phone automatically enables the media do-not-disturb mode. Alternatively, after the user triggers the "OK" control 1202, the display screen of the mobile phone jumps to a display interface for setting an app (for example, jumps to FIG. 5A or FIG. 5B), and then the user manually enables the media do-not-disturb mode.

In still another possible implementation, the mobile phone may determine, based on whether the mobile phone is currently in a wireless connection state, whether to output the third prompt information, where the third prompt information is used to prompt the user to disable the media do-not-disturb mode. It should be noted that, in this embodiment, that the mobile phone is in the wireless connection state means that the mobile phone is in a Wi-Fi connection state, or the mobile phone accesses another free network.

For example, when the mobile phone detects an operation of starting an app (an app having a media automatic playing function) by the user, or when a media playing window appears on a display interface of the app displayed on the display screen of the mobile phone, if the mobile phone detects that the mobile phone is currently in the wireless connection state and is currently in the media do-not-disturb mode, the third prompt information is displayed to prompt the user to disable the media do-not-disturb mode.

Figure 13:
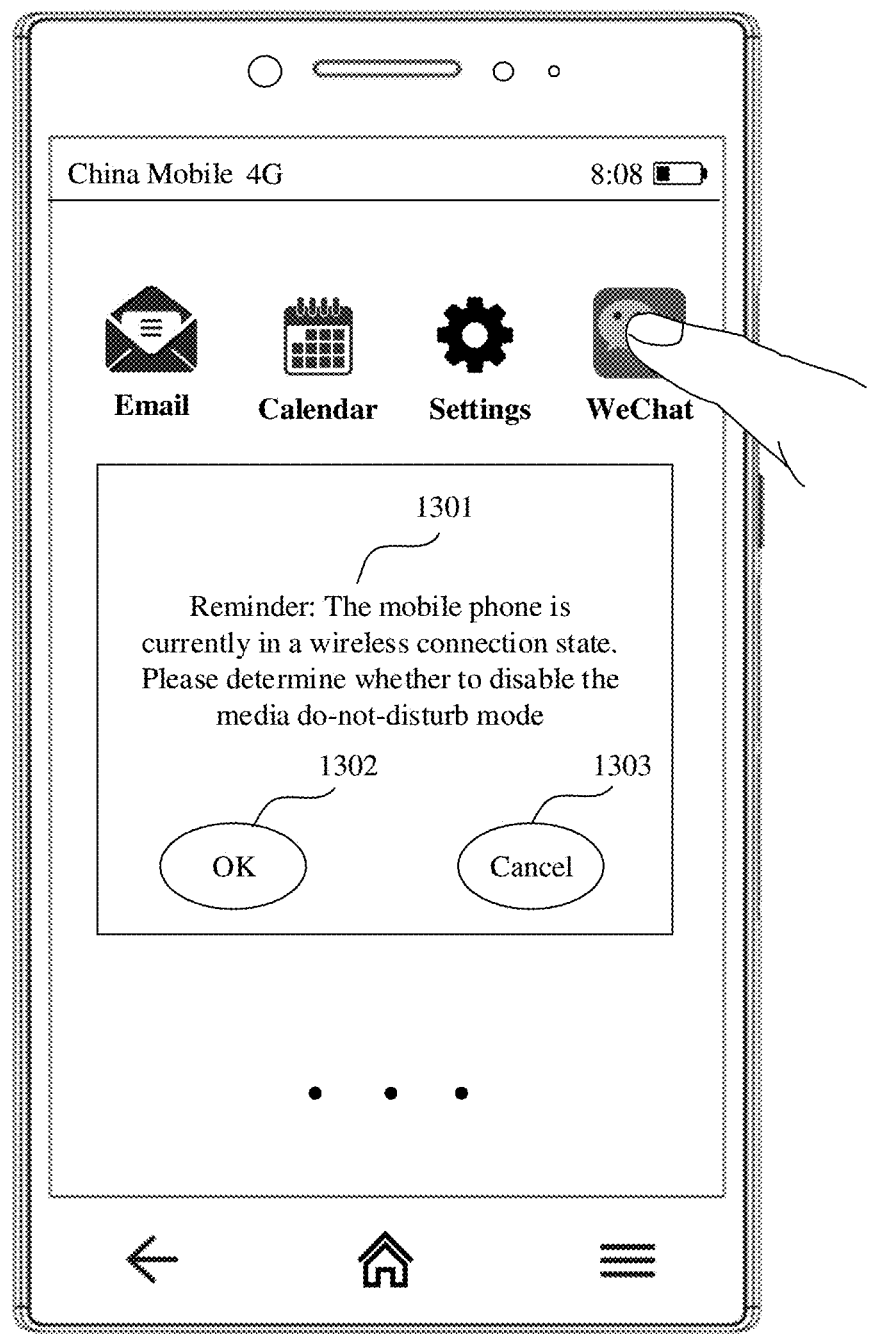
FIG. 13 is a schematic diagram of displaying third prompt information by a terminal according to an embodiment.

For example, FIG. 13 is a schematic diagram of displaying the third prompt information by the mobile phone. In FIG. 13, in response to an operation that is triggered by the user and that is used to start WECHAT, prompt information 1301 is displayed on the display screen of the mobile phone, which may be "The mobile phone is currently in a wireless connection state. Please determine whether to disable the media do-not-disturb mode".

The implementations provided herein may be randomly combined to achieve different effects.

In the foregoing embodiment provided herein, the method provided in said embodiment is described from a perspective in which the terminal is used as an execution body. To implement functions in the method provided in the foregoing embodiment, the terminal may include a hardware structure and/or a software module and implement the functions in a form of the hardware structure, the software module, or a combination of the hardware structure and the software module. Whether a function in the functions is executed by using the hardware structure, the software module, or the combination of the hardware structure and the software module depends on a application and a design constraint condition of the solution.

Figure 14:
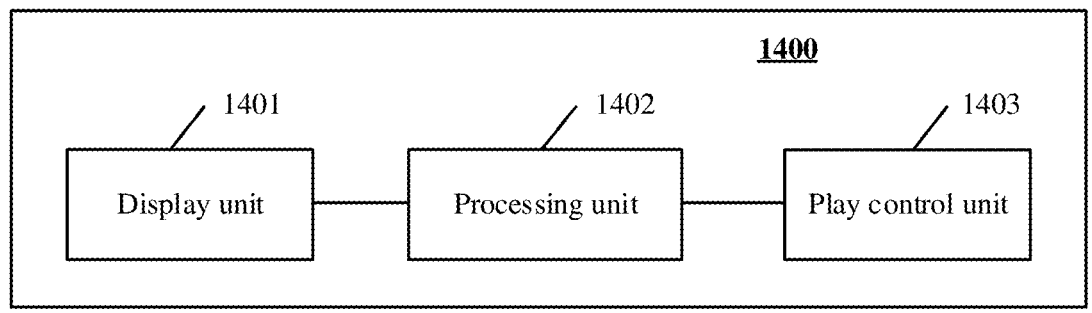
FIG. 14 is a schematic diagram of a terminal according to an embodiment.

Based on a same concept, FIG. 14 shows a terminal 1400 according to the embodiments. As shown in FIG. 14, the terminal 1400 includes a display unit 1401, a processing unit 1402, and a play control unit 1403.

The display unit 1401 is configured to display an interface of a first application on the terminal 1400.

The processing unit 1402 is configured to, when the interface of the first application includes a media playing window, and the first application is in a media do-not-disturb mode, determine whether playing of first media in the window is triggered by a playing operation of a user.

The play control unit 1403 is configured to play the corresponding media when the processing unit 1402 determines that the playing of the first media in the window is triggered by the playing operation of the user.

The play control unit 1403 is configured to pause or stop playing the corresponding media when the processing unit 1402 determines that the playing of the first media in the window is not triggered by the playing operation of the user.

Optionally, the processing unit 1402 is further configured to, when the interface of the first application includes the media playing window, create a player to play the first media, and determine a creation time point of the player. When determining whether the playing of the corresponding media in the window is triggered by the playing operation of the user, the processing unit 1402 may be configured to: determine whether a target input event exists in obtained input events, where the target input event is an input event corresponding to the playing operation of the user, a distribution time point of the target input event is earlier than the creation time point of the player, a time difference between the distribution time point of the target input event and the creation time point of the player is less than first preset duration, and the target input event is distributed to the first application; if the target input event exists, determine that the playing of the first media in the window is triggered by the playing operation of the user; and if the target input event does not exist, determine that the playing of the first media in the window is not triggered by the playing operation of the user.

Optionally, a package name of an application to which the target input event is distributed is the same as a package name of the first application; and/or a process ID of an application to which the target input event is distributed is the same as a process ID of the first application.

Optionally, the play control unit 1403 is further configured to pause or stop playing the first media when the processing unit 1402 determines that the playing of the first media in the window is not triggered by the playing operation of the user and determines that total duration of the first media is greater than second duration.

Optionally, the display unit 1401 is further configured to display a first control in the media playing window or in a pop-up window when the processing unit 1402 determines that the playing of the first media in the window is not triggered by the playing operation of the user, where the first control is used to trigger the playing of the first media.

The play control unit 1403 is further configured to play the first media when the processing unit 1402 detects that the first control is triggered.

Optionally, first prompt information in a form of text or icon is displayed in the media playing window or in the pop-up window, to prompt that automatic playing is not allowed or prompt the user whether to play the first media.

Optionally, the display unit 1401 is further configured to: when the processing unit 1402 responds to an operation of the user, or when it is detected that data traffic is turned on, or when the terminal 1400 is in a conference mode or a mute mode, display a first interface for setting the media do-not-disturb mode, where the first interface includes a control for setting whether to enable the media do-not-disturb mode.

The processing unit 1402 is further configured to, in response to an operation of activating, by the user, the control for setting whether to enable the media do-not-disturb mode, enable the media do-not-disturb mode for all or some applications on the terminal 1400.

Optionally, that the processing unit 1402 is configured to, in response to the operation of activating, by the user, the control for setting whether to enable the media do-not-disturb mode, enable the media do-not-disturb mode for all or some applications on the terminal 1400 may include: the display unit is configured to, when the processing unit 1402 responds to the operation of activating, by the user, the control for setting whether to enable the media do-not-disturb mode, display a second interface for setting the media do-not-disturb mode, where the second interface includes identifiers of M applications and M controls for setting whether to enable the media do-not-disturb mode, the M controls respectively correspond to the M applications, and M is an integer greater than or equal to 1; and the processing unit 1402 is configured to, by respectively responding to operations of activating, by the user, N controls in the M controls, enable the media do-not-disturb mode for N applications corresponding to the N controls, where N is an integer less than or equal to M.

Optionally, the display unit 1401 is further configured to, when the processing unit 1402 is further configured to respond to an operation of the user, or when it is detected that data traffic is turned on, or when the terminal 1400 is in a conference mode or a mute mode, display a second interface for setting the media do-not-disturb mode, where the second interface includes identifiers of M applications and M controls for setting whether to enable the media do-not-disturb mode, the M controls respectively correspond to the M applications, and M is an integer greater than or equal to 1.

Optionally, the display unit 1401 is further configured to, when the processing unit 1402 detects that the terminal 1400 accesses a wireless network, prompt the user to disable the media do-not-disturb mode, or display the first interface.

Optionally, the terminal 1400 includes a display screen and a memory. The memory stores a software program and/or a module of the first application, and a software program and/or a module at a framework layer. The display screen displays the interface of the first application. The framework layer determines whether playing of first media in the window is triggered by a playing operation of a user. The framework layer plays the corresponding media if the playing of the first media in the window is triggered by the playing operation of the user. The framework layer pauses or stops playing the corresponding media if the playing of the first media in the window is not triggered by the playing operation of the user.

Optionally, when the interface of the first application includes the media playing window, the method further includes: the framework layer creates a player to play the first media. The framework layer determines a creation time point of the player. Determination, by the framework layer, of whether the playing of the first media in the window is triggered by the playing operation of the user includes: the framework layer determines whether a target input event exists in obtained input events, where the target input event is an input event corresponding to the playing operation of the user, a distribution time point of the target input event is earlier than the creation time point of the player, a time difference between the distribution time point of the target input event and the creation time point of the player is less than first preset duration, and the target input event is distributed to the first application; if the target input event exists, the framework layer determines that the playing of the first media in the window is triggered by the playing operation of the user; and if the target input event does not exist, the framework layer determines that the playing of the first media in the window is not triggered by the playing operation of the user.

Figure 15:
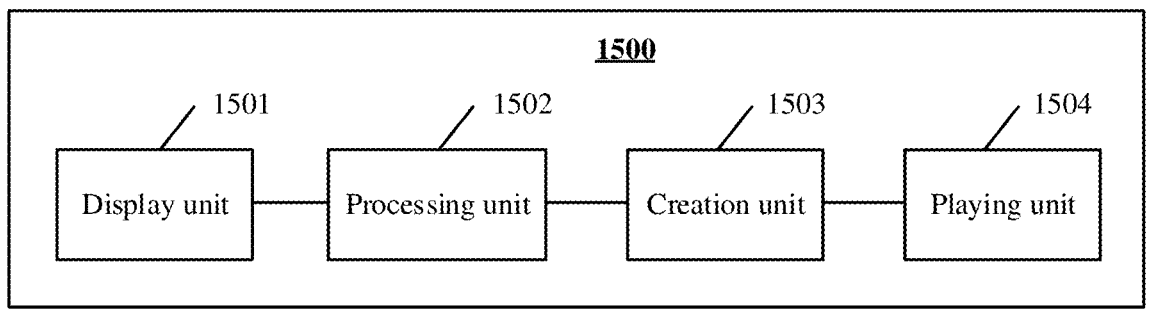
FIG. 15 is a schematic diagram of a terminal according to an embodiment.

Based on a same concept, FIG. 15 shows a terminal 1500 according to the embodiments. As shown in FIG. 15, the terminal 1500 includes a display unit 1501, a processing unit 1502, a creation unit 1503, and a playing unit 1504.

The display unit 1501 is configured to display an interface of a first application.

The processing unit 1502 is configured to, when the interface of the first application includes a media playing window, obtain request information that is generated by the first application and that is used to create a player; and if the first application is in a media do-not-disturb mode, determine whether generation of the request information is triggered by a playing operation of a user.

The creation unit 1503 is configured to create a player when the processing unit 1502 determines whether the generation of the request information is triggered by the playing operation of the user.

The playing unit 1504 is configured to play corresponding media.

Optionally, the request information includes a generation time point at which the first application generates the request information. When determining whether the generation of the request information is triggered by the playing operation of the user, the processing unit 1502 is configured to: determine whether a target input event exists in obtained input events, where the target input event is an input event corresponding to the playing operation of the user, a distribution time point of the target input event is earlier than the generation time point of the request information, a time difference between the distribution time point of the target input event and the generation time point is less than first preset duration, and the target input event is distributed to the first application; if the target input event exists, determine that the generation of the request information is triggered by the playing operation of the user; and if the target input event does not exist, determine that the generation of the request information is not triggered by the playing operation of the user.

Optionally, a package name of an application to which the target input event is distributed is the same as a package name of the first application; and/or a process ID of an application to which the target input event is distributed is the same as a process ID of the first application.

Optionally, the display unit 1501 is further configured to display a first control in the media playing window or in a pop-up window generate when the processing unit 1502 determines that the generation of the request information is not triggered by the playing operation of the user, where the first control is used to trigger creation of the player to play the first media.

The creation unit 1503 is further configured create the player when the processing unit 1502 detects that the first control is triggered. The playing unit 1504 is further configured to play the first media after the creation unit 1503 creates the player.

Optionally, first prompt information in a form of text or icon is displayed in the media playing window or in the pop-up window, to prompt that automatic playing is not allowed or prompt the user whether to play the first media.

Optionally, a condition for playing the first media in the window includes: all or some parts of the media playing window is displayed, or the media playing window is displayed in the center of a display screen of the terminal 1500.

Optionally, the display unit 1501 is further configured to: when the processing unit 1502 responds to an operation of the user, or when it is detected that data traffic is turned on, or when the terminal 1500 is in a conference mode or a mute mode, display a first interface for setting the media do-not-disturb mode, where the first interface includes a control for setting whether to enable the media do-not-disturb mode.

The processing unit 1502 is further configured to, in response to an operation of activating, by the user, the control for setting whether to enable the media do-not-disturb mode, enable the media do-not-disturb mode for all or some applications on the terminal 1500.

Optionally, that the processing unit 1502 is configured to, in response to the operation of activating, by the user, the control for setting whether to enable the media do-not-disturb mode, enable the media do-not-disturb mode for all or some applications on the terminal 1500 includes:

the display unit is configured to, when the processing unit 1502 responds to the operation of activating, by the user, the control for setting whether to enable the media do-not-disturb mode, display a second interface for setting the media do-not-disturb mode, where the second interface includes identifiers of M applications and M controls for setting whether to enable the media do-not-disturb mode, the M controls respectively correspond to the M applications, and M is an integer greater than or equal to 1; and the processing unit 1502 is configured to, by respectively responding to operations of activating, by the user, N controls in the M controls, enable the media do-not-disturb mode for N applications corresponding to the N controls, where N is an integer less than or equal to M.

Optionally, the display unit 1501 is further configured to, when the processing unit 1502 is further configured to respond to an operation of the user, or when it is detected that data traffic is turned on, or when the terminal 1500 is in a conference mode or a mute mode, display a second interface for setting the media do-not-disturb mode, where the second interface includes identifiers of M applications and M controls for setting whether to enable the media do-not-disturb mode, the M controls respectively correspond to the M applications, and M is an integer greater than or equal to 1.

Optionally, the display unit 1501 is further configured to, when the processing unit 1502 detects that the terminal 1500 accesses a wireless network, prompt the user to disable the media do-not-disturb mode, or display the first interface.

Optionally, the terminal 1500 includes a display screen and a memory. The memory includes a software program and/or a module of the first application, and a software program and/or a module at a framework layer. The display screen displays the interface of the first application. The framework layer obtains request information used to request to create a player. The framework layer determines whether generation of the request information is triggered by the playing operation of the user. If the generation of the request information is triggered by the playing operation of the user, the framework layer creates the player, to play corresponding media. If the generation of the request information is not triggered by the playing operation of the user, the framework layer rejects or discards the request information.

Optionally, the request information includes a generation time point at which the first application generates the request information. Determination, by the framework layer, of whether the generation of the request information is triggered by the playing operation of the user includes: the framework layer determines whether a target input event exists in obtained input events, where the target input event is an input event corresponding to the playing operation of the user, a distribution time point of the target input event is earlier than the generation time point of the request information, a time difference between the distribution time point of the target input event and the generation time point is less than first preset duration, and the target input event is distributed to the first application; if the target input event exists, the framework layer determines that the generation of the request information is triggered by the playing operation of the user; and if the target input event does not exist, the framework layer determines that the generation of the request information is not triggered by the playing operation of the user.

With descriptions of the foregoing embodiments, a person skilled in the art may clearly understand that the embodiments provided herein may be implemented by hardware, firmware, or a combination thereof. When the embodiments provided herein are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. This is used as an example, but is not limited to: the computer-readable medium may include a RAM, a ROM, an electrically erasable programmable read-only memory, a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and disc used by the embodiments include a compact disc (CD), a laser disc, an optical disc, a digital video disc (DVD), a floppy disk and a Blu-ray disc, where the disk generally copies data by a magnetic means, and the disc copies data optically by a laser means. The foregoing combination should also be included in the scope of the computer-readable medium.

In summary, what is described above is merely a set of embodiments, which is not intended to limit the scope of the embodiments. Any modification, equivalent replacement, or improvement made according to the embodiments shall fall within the scope of the embodiments.

What is claimed is:

1. A do-not-disturb method, applicable to a terminal on which a first application is installed, the do-not-disturb method comprising:
   displaying a first interface of the first application based on data traffic of the terminal;
   when the first interface of the first application comprises a window for playing media and the first application is in a media do-not-disturb mode, wherein a user is actively prompted to set the media do-not-disturb mode, determining whether playing first media in the window is triggered by a first operation of a user, and the media play content is an advertisement;
   when playing the first media in the window is triggered by the first operation of the user, playing the first media based on the data traffic, receiving a second operation, suspending an image signal of the first media in response to the second operation, and playing a sound signal of the first media based on the data traffic; and,
   when playing the first media in the window is not triggered by a play operation of the user, pausing or stopping playing the first media.

2. The do-not-disturb method according to claim 1, wherein the first application is a video application dedicated to providing video content.

3. The do-not-disturb method according to claim 1, wherein, before the method is executed, the method further comprises:
   receiving a third operation, wherein the third operation is used to enable a media do-not-disturb mode.

4. The do-not-disturb method according to claim 1, wherein, when the interface of the first application comprises a window for playing media, the window for playing media is partially displayed in the first interface.

5. The do-not-disturb method according to claim 1, further comprising:
   pausing the image signal of the media; and
   displaying a frame of image on a first interface.

6. The do-not-disturb method according to claim 1, further comprising:
   displaying a second interface of the first application;
   when the second interface of the first application comprises a window for playing media and the first application is in the media do-not-disturb mode, the media do-not-disturb mode is used to save data traffic, determining whether playing second media in the window is triggered by the first operation of the user;
   after playing the second media in the window is triggered by the first operation of the user, playing the second media; and
   after playing the second media in the window is not triggered by a play operation of the user, pausing or stopping playing the second media.

7. A do-not-disturb method, applicable to a terminal on which a first application is installed, comprising:
   displaying a first interface of the first application based on data traffic of the terminal;
   when the first interface of the first application comprises a window for playing media and the first application is in the media do-not-disturb mode, wherein a user is actively prompted to set the media do-not-disturb mode, determining whether playing first media in the window is triggered by a first operation of a user, and the media play content is an advertisement;
   after playing the first media in the window is triggered by the first operation of the user, playing the corresponding media based on the data traffic;
   after playing the first media in the window is not triggered by a play operation of the user, pausing or stopping playing the corresponding media;
   displaying a second interface of the first application based on the data traffic;
   when the second interface of the first application comprises a window for playing media and the first application is in the media do-not-disturb mode, the media do-not-disturb mode is used to save data traffic, determining whether playing second media in the window is triggered by the first operation of the user;

after playing the second media in the window is triggered by the first operation of the user, playing the second media based on the data traffic; and after playing the second media in the window is not triggered by a play operation of the user, pausing or stopping playing the second media.

8. A terminal, comprising a processor; and a memory, wherein the memory is configured to store one or more computer programs; and, when the one or more computer programs stored in the memory are executed by the processor, the terminal performs the do-not-disturb method according to claim 1.

9. A non-transitory computer storage medium, wherein the non-transitory computer readable storage medium comprises a computer program, and when the computer program runs on a terminal, the terminal is enabled to perform the do-not-disturb method according to claim 1.

* * * * *